US009870395B2

(12) United States Patent
Kealey et al.

(10) Patent No.: US 9,870,395 B2
(45) Date of Patent: *Jan. 16, 2018

(54) CONDITIONED TRANSMISSION OF QUERY RESPONSES AND CONNECTION ASSESSMENTS

(71) Applicant: Pearson Education, Inc., New York, NY (US)

(72) Inventors: Brendan Kealey, Iowa City, IA (US); Paul Arens, Coralville, IA (US); Adam Krapfl, Mount Vernon, IA (US); Paul Grudnitski, Torrance, CA (US); Rob Nielsen, Prior Lake, MN (US); James Setaro, Austin, TX (US); Jason Sobanski, Savage, MN (US)

(73) Assignee: PEARSON EDUCATION, INC., New York, NY (US)

( * ) Notice: Subject to any disclaimer, the term of this patent is extended or adjusted under 35 U.S.C. 154(b) by 382 days.

This patent is subject to a terminal disclaimer.

(21) Appl. No.: 14/753,858

(22) Filed: Jun. 29, 2015

(65) Prior Publication Data

US 2015/0302057 A1 Oct. 22, 2015

Related U.S. Application Data

(63) Continuation-in-part of application No. 14/222,317, filed on Mar. 21, 2014, now Pat. No. 9,105,194.

(51) Int. Cl.
*G06F 17/30* (2006.01)
*G09B 7/02* (2006.01)

(52) U.S. Cl.
CPC .. *G06F 17/30442* (2013.01); *G06F 17/30864* (2013.01); *G09B 7/02* (2013.01)

(58) Field of Classification Search
CPC .................................................. G06F 17/30442
(Continued)

(56) References Cited

U.S. PATENT DOCUMENTS 5,719,110 A * 2/1998 Cook ................... C11D 3/0078
134/42
7,483,670 B2 1/2009 Walker et al.
(Continued)

OTHER PUBLICATIONS

Automatic Reconnect, Web Archive, Web. Dec. 22, 2011. https://web.archive.org/web/20111222094650/http://wiki.tcl.tk/12379>.
(Continued)

*Primary Examiner* — Thomas Hong
(74) *Attorney, Agent, or Firm* — Kilpatrick Townsend & Stockton LLP

(57) ABSTRACT

Embodiments relate to systems and methods for electronically conditioning transmission of communications based on results of a connection assessment. An electronic file is executed at an electronic device, which causes a first query and a second query to be presented. A first query response and a second query response are identified. The first query response is stored in a locked configuration that inhibits the ability to modify the first query response to the first query. The second query response is stored but is not stored in the locked configuration. Query response data is generated that includes an identifier of the second query, an identifier of the second query response and an identifier of the electronic device. A connection variable is determined by assessing one or more network connections available to the electronic device. When a transmission condition is satisfied, the query response data is transmitted to another device.

20 Claims, 13 Drawing Sheets

(58) Field of Classification Search
USPC .......................................................... 434/362
See application file for complete search history.

(56) References Cited

U.S. PATENT DOCUMENTS

| | | | |
|---|---|---|---|
| 2005/0182306 | A1 | 8/2005 | Sloan |
| 2006/0282896 | A1* | 12/2006 | Qi ........................... G06F 21/57 726/25 |
| 2009/0271517 | A1 | 10/2009 | Naylor et al. |
| 2012/0034590 | A1 | 2/2012 | Sloan |
| 2013/0080870 | A1 | 3/2013 | Jacobs |
| 2013/0209982 | A1* | 8/2013 | Rooks ...................... G09B 7/00 434/350 |
| 2013/0227703 | A1* | 8/2013 | Sotos ...................... H04L 69/14 726/26 |
| 2014/0186814 | A1 | 7/2014 | Rooks et al. |

OTHER PUBLICATIONS

BitZipper FAQ, Web Archive, Mar. 10, 2013. <https://web.archive.org/web/20130310110014/http://www.bitzipper.com/faq_run.html>.
ExamSoft: How it works, Web Archive, Web. Mar. 17, 2013, https://web.archive.org/web/20130317090511//http://learn.examsoft.com/how-it-works-4>.
Final Office Action dated Sep. 12, 2014, for U.S. Appl. No. 14/194,160, 13 pages.
First Action Interview Pilot Program Pre-Interview communication mailed May 1, 2014, for U.S. Appl. No. 14/194,160, 4 pages.
First Action Interview Pilot Program Pre-Interview communication dated Jun. 10, 2014, for U.S. Appl. No. 14/222,350, 4 pages.
IP Address Blocking, Web Archive, Web. Jan. 25, 2013. <https://web.archive.org/web/20130125194757//http://en.wikipedia.org/wiki/IP_address_blocking>, hereinafter IPBlock.
Javascript—Browswer Detect and CSS Switch, Web Archive, Web. Jul. 14, 2012. https://web.archive.org/web/20120714071945/web.archive.org/web/20120714071945/http://www.dreamincode.net/forums/topic/30206-javascript-browswer-detect-and-css-switch/>.
Non-Final Office Action dated Jan. 30, 2015, for U.S. Appl. No. 14/194,160, all pages.
Notice of Allowance and Fee(s) Due dated Aug. 11, 2015, for U.S. Appl. No. 14/194,160, 9 pages.
Pearson Education, Inc., *TestNav 7 Combined Technical Guide* Feb. 16, 2012.
Screened Subnet Firewall, Web Archive, Web. Jan. 1, 2013. <https://web.archive.org/web/20130113065341/http://www.vtcif.telstra.com.au/pub/docs/security/800-10/node58.html>.
U.S. Appl. No. 14/194,160, filed Feb. 28, 2014, by Jesse E. Peterson, 53 pages.
U.S. Appl. No. 14/222,350, filed Mar. 21, 2014, by Brendan Jared Kealey, 48 pages.
Notice of Publication dated Sep. 3, 2015, for U.S. Appl. No. 14/194,160.
Supplemental Notice of Allowability dated Nov. 10, 2015, for U.S. Appl. No. 14/194,160, 2 pages.

\* cited by examiner

CONDITIONED TRANSMISSION OF QUERY RESPONSES AND CONNECTION ASSESSMENTS

CROSS-REFERENCE OF RELATED APPLICATIONS

This application is a continuation-in-part of U.S. application Ser. No. 14/222,317, filed on Mar. 21, 2014, which is hereby incorporated by reference in its entirety for all purposes.

FIELD

This disclosure relates in general to methods and systems for executing files and electronically conditioning transmission of communications based on results of a connection assessment.

BACKGROUND

Communication exchanges between devices are becoming increasingly frequent and important. In some instances, a first communication is received at a device, and one or more second communications are generated that include data responsive to content in the first communication. However, circumstances may exist where a reliability at which the second communication(s) can be successfully transmitted is questionable or poor. Thus, techniques that identify transmission conditions and transmission characteristics would advantageous.

SUMMARY

In some embodiments, a system for electronically conditioning transmission of communications based on results of a connection assessment is provided. A file retriever receives, at an electronic device, one or more electronic files. An access engine executes at least one of the one or more electronic files, wherein the execution causes each of a first query and a second query to be presented at the electronic device. A query response engine identifies a first query response corresponding to the first query and stores the first query response in a locked configuration. The locked configuration inhibits the ability to modify the first query response to the first query. The query engine also identifies a second query response corresponding to the second query and stores the second query response. The second query response is not stored in a locked configuration and is stored in a configuration that enables the stored second query response to be modified. The query engine further generates query response data that includes an identifier of each of one or more queries, an identifier of each of one or more query responses, and an identifier of the electronic device, the one or more queries including the second query, and the one or more query responses includes the second query response. A connection assessor determines a connection variable by assessing one or more network connections available to the electronic device and determines whether a transmission condition is satisfied based on the connection variable. The determination includes comparing the connection variable to a threshold. A result of the determination indicates that the transmission condition is satisfied when the connection variable exceeds the threshold. A query response transmitter transmits, when it is determined that the transmission condition is satisfied, the query response data from the electronic device to another device.

In some embodiments, a computer-implemented method for electronically conditioning transmission of communications based on results of a connection assessment is provided. At an electronic device, one or more electronic files are executed, which causes each of a first query and a second query to be presented at the electronic device. A first query response corresponding to the first query is identified. The first query response is stored in a locked configuration that inhibits the ability to modify the first query response to the first query. A second query response corresponding to the second query is identified and stored at the electronic device. The second query response is not stored in a locked configuration and is stored in a configuration that enables the stored second query response to be modified. Query response data is generated that includes an identifier of each of one or more queries, an identifier of each of one or more query responses, and an identifier of the electronic device. The one or more queries include the second query, and the one or more query responses include the second query response. A connection variable is determined by assessing one or more network connections available to the electronic device. It is determined whether a transmission condition is satisfied based on the connection variable. The determination includes comparing the connection variable to a threshold. A result of the determination indicates that the transmission condition is satisfied when the connection variable exceeds the threshold. When it is determined that the transmission condition is satisfied, the query response data is transmitted from the electronic device to another device. A set of electronic files is received that include the one or more electronic files. The one or more electronic files includes a first executable file compatible with a first browser. The set of electronic files includes a second executable file compatible with a second browser. It is identified that code for the first browser is being executed on the electronic device. The first executable file for execution is selected based on the identification that code for the first browser is being executed and the second executable file is not executed at the electronic device.

In some embodiments, a computer-program product tangibly embodied in a non-transitory machine-readable storage medium, including instructions configured to cause one or more data processors to perform one or more actions from one or more processes disclosed herein.

In some embodiments, a computer program product is provided that is tangibly embodied in a non-transitory machine-readable storage medium. The computer program product includes instructions configured to cause one or more data processors to perform actions including part or all of a method disclosed herein.

Further areas of applicability of the present disclosure will become apparent from the detailed description provided hereinafter. It should be understood that the detailed description and specific examples, while indicating various embodiments, are intended for purposes of illustration only and are not intended to necessarily limit the scope of the disclosure.

BRIEF DESCRIPTION OF THE DRAWINGS

The present disclosure is described in conjunction with the appended figures.

In the appended figures, similar components and/or features can have the same reference label. Further, various components of the same type can be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION

The ensuing description provides illustrative embodiment(s) only and is not intended to limit the scope, applicability or configuration of the disclosure. Rather, the ensuing description of the illustrative embodiment(s) will provide those skilled in the art with an enabling description for implementing a preferred exemplary embodiment. It is understood that various changes can be made in the function and arrangement of elements without departing from the spirit and scope as set forth in the appended claims.

Figure 1:
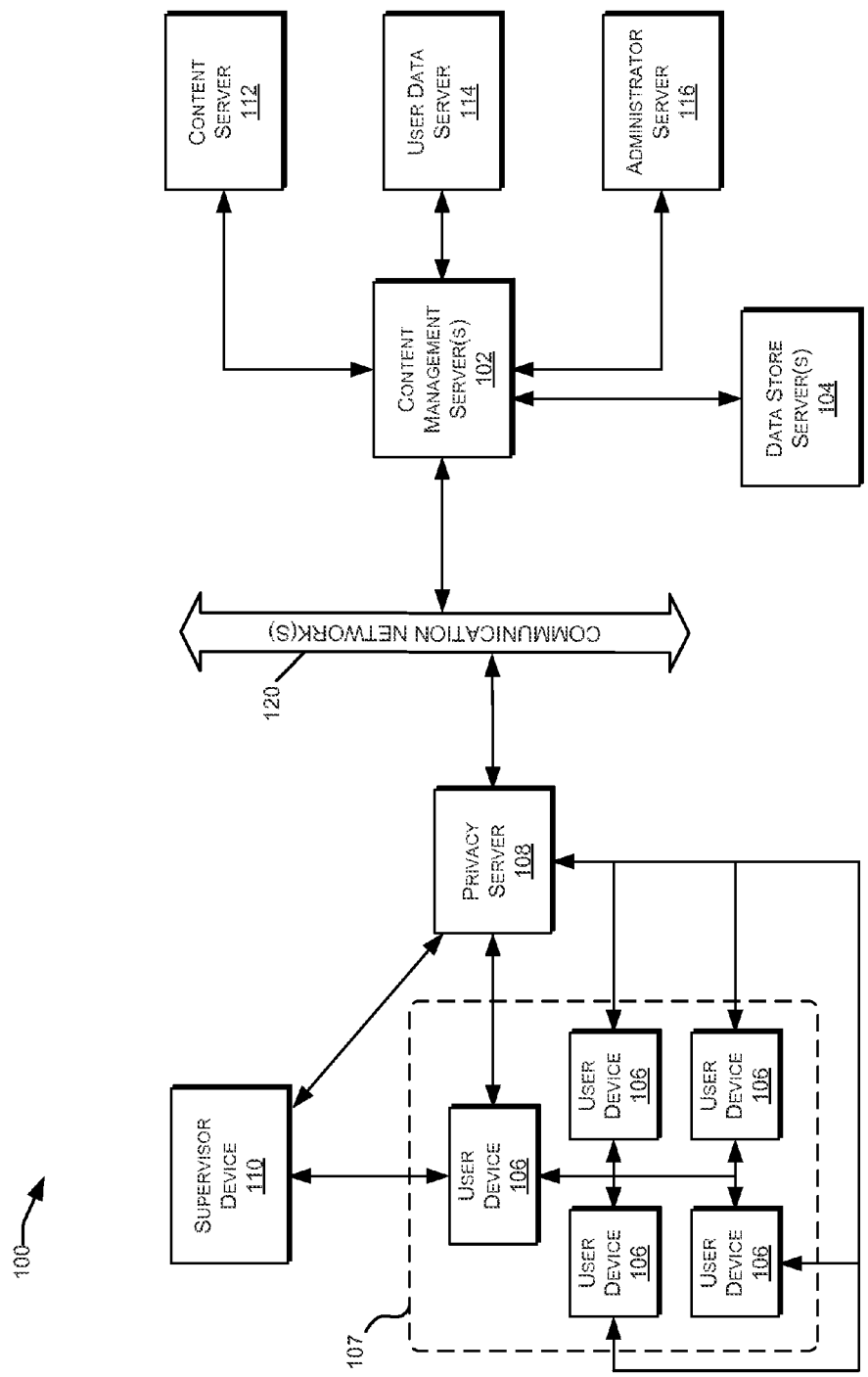
FIG. 1 is a block diagram showing illustrating an example of a content distribution network.

With reference now to FIG. 1, a block diagram is shown illustrating various components of a content distribution network (CDN) 100 which implements and supports certain embodiments and features described herein. Content distribution network 100 may include one or more content management servers 102. As discussed below in more detail, content management servers 102 may be any desired type of server including, for example, a rack server, a tower server, a miniature server, a blade server, a mini rack server, a mobile server, an ultra-dense server, a super server, or the like, and may include various hardware components, for example, a motherboard, a processing units, memory systems, hard drives, network interfaces, power supplies, etc. Content management server 102 may include one or more server farms, clusters, or any other appropriate arrangement and/or combination or computer servers. Content management server 102 may act according to stored instructions located in a memory subsystem of the server 102, and may run an operating system, including any commercially available server operating system and/or any other operating systems discussed herein.

The content distribution network 100 may include one or more data store servers 104, such as database servers and file-based storage systems. Data stores 104 may comprise stored data relevant to the functions of the content distribution network 100. Illustrative examples of data stores 104 that may be maintained in certain embodiments of the content distribution network 100 are described below in reference to FIG. 3. In some embodiments, multiple data stores may reside on a single server 104, either using the same storage components of server 104 or using different physical storage components to assure data security and integrity between data stores. In other embodiments, each data store may have a separate dedicated data store server 104.

Content distribution network 100 also may include one or more user devices 106 (e.g., electronic user devices) and/or supervisor devices 110 (e.g., electronic supervisor devices). User devices 106 and supervisor devices 110 may display content received via the content distribution network 100, and may support various types of user interactions with the content. User devices 106 and supervisor devices 110 may include mobile devices such as smartphones, tablet computers, personal digital assistants, and wearable computing devices. Such mobile devices may run a variety of mobile operating systems, and may be enabled for Internet, e-mail, short message service (SMS), Bluetooth®, mobile radio-frequency identification (M-RFID), and/or other communication protocols. Other user devices 106 and supervisor devices 110 may be general purpose personal computers or special-purpose computing devices including, by way of example, personal computers, laptop computers, workstation computers, projection devices, and interactive room display systems. Additionally, user devices 106 and supervisor devices 110 may be any other electronic devices, such as a thin-client computers, an Internet-enabled gaming systems, business or home appliances, and/or a personal messaging devices, capable of communicating over network(s) 120.

In different contexts of content distribution networks 100, user devices 106 and supervisor devices 110 may correspond to different types of specialized devices, for example, student devices and teacher devices in an educational network, employee devices and presentation devices in a company network, different gaming devices in a gaming network, etc. In some embodiments, user devices 106 and supervisor devices 110 may operate in the same physical location 107, such as a classroom or conference room. In such cases, the devices may contain components that support direct communications with other nearby devices, such as a wireless transceivers and wireless communications interfaces, Ethernet sockets or other Local Area Network (LAN) interfaces, etc. In other implementations, the user devices 106 and supervisor devices 110 need not be used at the same location 107, but may be used in remote geographic locations in which each user device 106 and supervisor device 110 may use security features and/or specialized hardware (e.g., hardware-accelerated SSL and HTTPS, WS-Security, firewalls, etc.) to communicate with the content management server 102 and/or other remotely located user devices 106. Additionally, different user devices 106 and supervisor devices 110 may be assigned different designated roles, such as presenter devices, teacher devices, administrator devices, or the like, and in such cases the different devices may be provided with additional hardware and/or software components to provide content and support user capabilities not available to the other devices.

The content distribution network 100 also may include a privacy server 108 that maintains private user information at the privacy server 108 while using applications or services hosted on other servers. For example, the privacy server 108 may be used to maintain private data of a user within one jurisdiction even though the user is accessing an application hosted on a server (e.g., the content management server 102) located outside the jurisdiction. In such cases, the privacy server 108 may intercept communications between a user device 106 or supervisor device 110 and other devices that include private user information. The privacy server 108 may create a token or identifier that does not disclose the private information and may use the token or identifier when communicating with the other servers and systems, instead of using the user's private information.

As illustrated in FIG. 1, the content management server 102 may be in communication with one or more additional servers, such as a content server 112, a user data server 112, and/or an administrator server 116. Each of these servers may include some or all of the same physical and logical components as the content management server(s) 102, and in some cases, the hardware and software components of these servers 112-116 may be incorporated into the content management server(s) 102, rather than being implemented as separate computer servers.

Content server 112 may include hardware and software components to generate, store, and maintain the content resources for distribution to user devices 106 and other devices in the network 100. For example, in content distribution networks 100 used for professional training and educational purposes, content server 112 may include data stores of training materials, presentations, interactive programs and simulations, course models, course outlines, and various training interfaces that correspond to different materials and/or different types of user devices 106. In content distribution networks 100 used for media distribution, interactive gaming, and the like, a content server 112 may include media content files such as music, movies, television programming, games, and advertisements.

User data server 114 may include hardware and software components that store and process data for multiple users relating to each user's activities and usage of the content distribution network 100. For example, the content management server 102 may record and track each user's system usage, including their user device 106, content resources accessed, and interactions with other user devices 106. This data may be stored and processed by the user data server 114, to support user tracking and analysis features. For instance, in the professional training and educational contexts, the user data server 114 may store and analyze each user's training materials viewed, presentations attended, courses completed, interactions, evaluation results, and the like. The user data server 114 may also include a repository for user-generated material, such as evaluations and tests completed by users, and documents and assignments prepared by users. In the context of media distribution and interactive gaming, the user data server 114 may store and process resource access data for multiple users (e.g., content titles accessed, access times, data usage amounts, gaming histories, user devices and device types, etc.).

Administrator server 116 may include hardware and software components to initiate various administrative functions at the content management server 102 and other components within the content distribution network 100. For example, the administrator server 116 may monitor device status and performance for the various servers, data stores, and/or user devices 106 in the content distribution network 100. When necessary, the administrator server 116 may add or remove devices from the network 100, and perform device maintenance such as providing software updates to the devices in the network 100. Various administrative tools on the administrator server 116 may allow authorized users to set user access permissions to various content resources, monitor resource usage by users and devices 106, and perform analyses and generate reports on specific network users and/or devices (e.g., resource usage tracking reports, training evaluations, etc.).

The content distribution network 100 may include one or more communication networks 120. Although only a single network 120 is identified in FIG. 1, the content distribution network 100 may include any number of different communication networks between any of the computer servers and devices shown in FIG. 1 and/or other devices described herein. Communication networks 120 may enable communication between the various computing devices, servers, and other components of the content distribution network 100. As discussed below, various implementations of content distribution networks 100 may employ different types of networks 120, for example, computer networks, telecommunications networks, wireless networks, and/or any combination of these and/or other networks.

It will be appreciated that content distribution network 100 can include one or more other devices and/or servers not depicted in FIG. 1. For example, content distribution network 100 (e.g., which can include or can be a central server) can include a relay device (e.g., which can include or can be a proctor device) that can be connected to one or more user devices 106 and to a remote content management server 102. The relay device may be, in some instances, located in a same room and/or a same building as the one or more user devices. Depending on the embodiment, the relay device may be connected to content management server 102 and the one or more user devices 106 over a same or different types of networks. For example, the relay device may be connected to content management server 102 via a wireless connection (e.g., WiFi) and to the one or more user devices 106 via a short-range (e.g., Bluetooth) connection, wired network and/or local network.

The relay device may retrieve one or more files (e.g., a power file and/or one or more executable files) from content management server 102. In some instances, the one or more files are encrypted, and the relay device may, or may not, decrypt the file(s). The relay device may be configured to encrypt (e.g., encrypt a file not encrypted when received; encrypt a decrypted file; or doubly encrypt a file). The encryption may be configured such that an encrypted file transmitted to each of multiple user devices can be decrypted with a same key, or the encryption can include a layer specific to a user device. For example, a key (or part thereof) may correspond to a particular user, account or user device. A key may include multiple components, with one component being user-specific; one component being specific to a file or file class (e.g., a particular exam); one component being specific to a date; and/or one component being specific to a location.

The relay device may subsequently (e.g., at or after a defined time and/or upon receiving an instruction from content management server 102 or request from a user device) transmit the one or more files to a user device. The one or more files can include one or more executable files. When the one or more files are received at the user device, the user device may decrypt the file(s) (e.g., individually or a collection of the files) using a stored key or a derived key. For example, the one or more files can be transmitted with or in association with a file that identifies a protocol for generating a key (e.g., using an identifier of a time, location, user, user device and/or account).

When executed, an executable file can facilitate or cause one or more queries (e.g., one or more questions) to be presented at an executing device. The execution can further cause or facilitate a response to each of the one or more queries to be identified. For example, a input can be provided at an interface, which can be associated with response.

The response can be stored in a locked or unlocked configuration. A locked configuration can be one that inhibits or prevents the response from being changed via subsequent input. For example, once input identifies a particular response for a given query, storing the particular response in a locked configuration can prevent identifying a different response for that query. In some instances, one or more responses (e.g., identified while executing a given executable file and/or provided in response to a query in a given exam) are stored in a locked configuration and one or more other responses (e.g., identified while executing the same given executable file and/or provided in response to another query in the same given exam) are stored in an unlocked configuration.

In one instance, a response is stored in a locked configuration when a particular input has been received at the executing user device (e.g., submitting or locking a response). In one instance, a response is stored in a locked configuration (which can include changing the configuration to a locked configuration) after a defined time period has passed or a defined number of other responses have been provided since identifying the response. In one instance, a response is stored in a locked configuration when one or more subsequent queries have been identified based on the response. In one instance, a response is stored in a locked configuration when response data identifying the response has been transmitted or successfully transmitted (e.g., to a relay device or content management server 102). In one instance, a structure file identifies which responses are to be stored in a locked configuration, whether all responses are to be stored in a locked (or unlocked) configuration and/or any conditions (e.g., time passage, query adaptation, local input, etc.) for storing a response in a locked configuration.

Response data can include one or more responses (e.g., identified in association with a corresponding one or more questions). Response data may further include an identifier of a user, electronic device, user account, and/or one or more times (e.g., a time at which response data is generated or a time at which each of one or more responses were provided). Response data may be transmitted (e.g., to a relay device or content management server 102). The response data may be transmitted, for example, upon a defined number of responses being identified and/or stored; at one or more defined times; at defined time intervals; upon receiving a local instruction (e.g., a submission instruction or response-confirmation indication) initiating the transmission; and/or upon receiving a request for response data (e.g., from a relay device).

The transmission may further and/or alternatively depend on network factors. For example, transmission of response data may require that a threshold number (e.g., at least one or at least a defined non-one number) of networks are available; that a threshold number of networks having a network strength greater than or equal to a strength threshold (e.g., a non-zero strength threshold) are available; that a threshold number of networks of a particular type (e.g., short-range network, WiFi network, or a Bluetooth network) are available; that a particular or threshold number of networks have an upload speed that is at least a defined upload speed threshold; that a particular or threshold number of networks have a download speed that is at least a defined download speed threshold; and/or that a particular or threshold number of networks have a latency less than or equal to a defined latency threshold.

When response data is transmitted to the relay device, the relay device may subsequently transmit the response data (e.g., and an appended or processed version thereof) to content management server 102.

Figure 2:
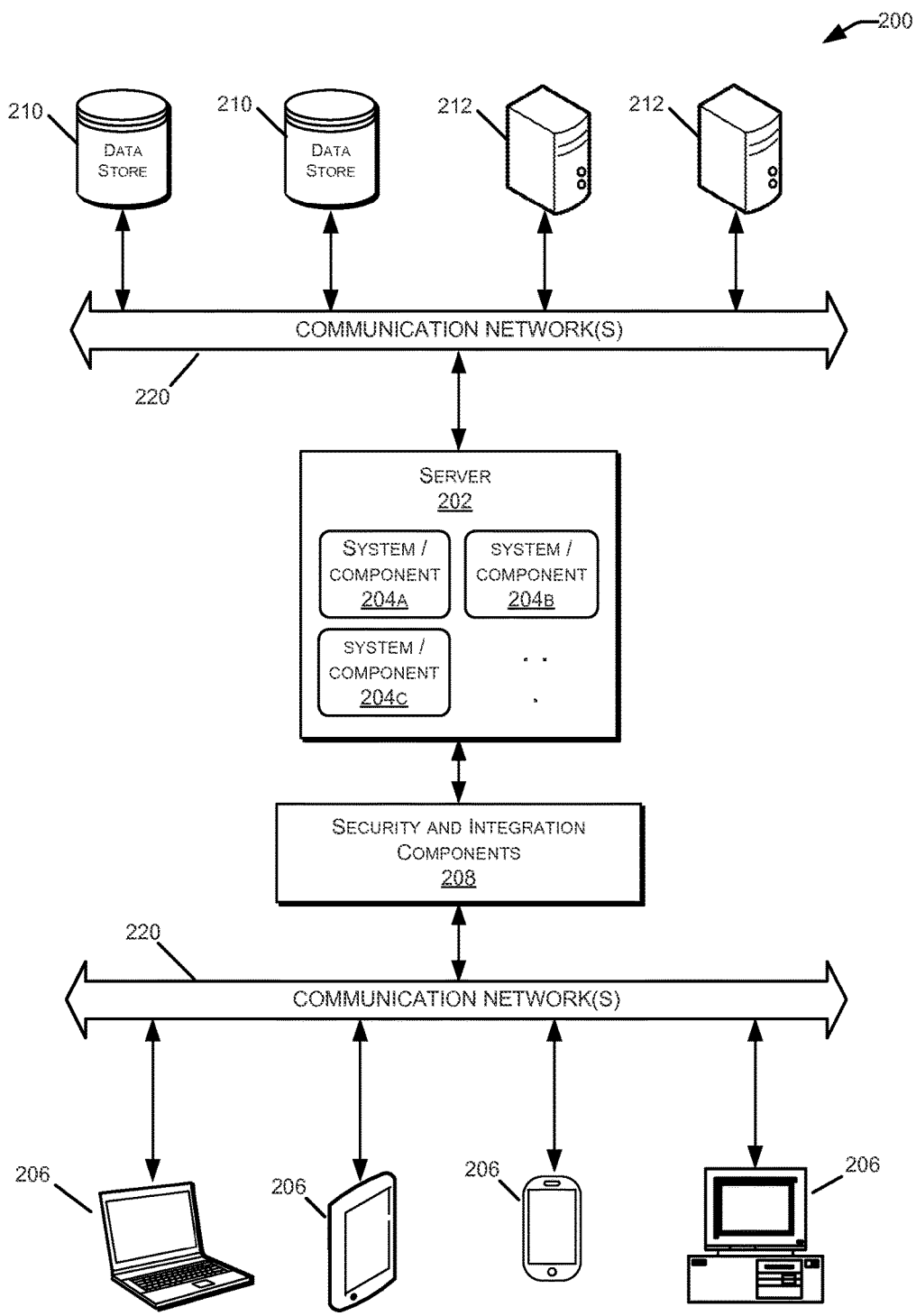
FIG. 2 is a block diagram illustrating a computer server and computing environment within a content distribution network.

With reference to FIG. 2, an illustrative distributed computing environment 200 is shown including a computer server 202, four client computing devices 206, and other components that may implement certain embodiments and features described herein. In some embodiments, the server 202 may correspond to the content management server 102 discussed above in FIG. 1, and the client computing devices 206 may correspond to the user devices 106. However, the computing environment 200 illustrated in FIG. 2 may correspond to any other combination of devices and servers configured to implement a client-server model or other distributed computing architecture. In one instance, computer server 202 may correspond to a relay device. In one instance, computer server 202 may correspond to a distributed system, such as one that resides in part at a relay device and in part at a remote content management server 102 (e.g., in a cloud).

Client devices 206 may be configured to receive and execute client applications over one or more networks 220. Such client applications may be web browser based applications and/or standalone software applications, such as mobile device applications. Server 202 may be communicatively coupled with the client devices 206 via one or more communication networks 220. Client devices 206 may receive client applications from server 202 or from other application providers (e.g., public or private application stores). Server 202 may be configured to run one or more server software applications or services, for example, web-based or cloud-based services, to support content distribution and interaction with client devices 206. Users operating client devices 206 may in turn utilize one or more client applications (e.g., virtual client applications) to interact with server 202 to utilize the services provided by these components.

Various different subsystems and/or components 204 may be implemented on server 202. Users operating the client devices 206 may initiate one or more client applications to use services provided by these subsystems and components. The subsystems and components within the server 202 and client devices 206 may be implemented in hardware, firmware, software, or combinations thereof. Various different system configurations are possible in different distributed computing systems 200 and content distribution networks 100. The embodiment shown in FIG. 2 is thus one example of a distributed computing system and is not intended to be limiting.

Although exemplary computing environment 200 is shown with four client computing devices 206, any number of client computing devices may be supported. Other devices, such as specialized sensor devices, etc., may interact with client devices 206 and/or server 202.

As shown in FIG. 2, various security and integration components 208 may be used to send and manage communications between the server 202 and user devices 206 over one or more communication networks 220. The security and integration components 208 may include separate servers, such as web servers and/or authentication servers, and/or specialized networking components, such as firewalls, routers, gateways, load balancers, and the like. In some cases, the security and integration components 208 may correspond to a set of dedicated hardware and/or software operating at the same physical location and under the control of same entities as server 202. For example, components 208 may include one or more dedicated web servers and network hardware in a datacenter or a cloud infrastructure. In other examples, the security and integration components 208 may correspond to separate hardware and software components which may be operated at a separate physical location and/or by a separate entity.

Security and integration components 208 may implement various security features for data transmission and storage, such as authenticating users and restricting access to unknown or unauthorized users. In various implementations, security and integration components 208 may provide, for example, a file-based integration scheme or a service-based integration scheme for transmitting data between the various devices in the content distribution network 100. Security and integration components 208 also may use secure data transmission protocols and/or encryption for data transfers, for example, File Transfer Protocol (FTP), Secure File Transfer Protocol (SFTP), and/or Pretty Good Privacy (PGP) encryption.

In some embodiments, one or more web services may be implemented within the security and integration components 208 and/or elsewhere within the content distribution network 100. Such web services, including cross-domain and/or cross-platform web services, may be developed for enterprise use in accordance with various web service standards, such as the Web Service Interoperability (WS-I) guidelines. For example, some web services may use the Secure Sockets Layer (SSL) or Transport Layer Security (TLS) protocol to provide secure connections between the server 202 and user devices 206. SSL or TLS may use HTTP or HTTPS to provide authentication and confidentiality. In other examples, web services may be implemented using the WS-Security standard, which provides for secure SOAP messages using XML encryption. In other examples, the security and integration components 208 may include specialized hardware for providing secure web services. For example, security and integration components 208 may include secure network appliances having built-in features such as hardware-accelerated SSL and HTTPS, WS-Security, and firewalls. Such specialized hardware may be installed and configured in front of any web servers, so that any external devices may communicate directly with the specialized hardware.

Communication network(s) 220 may be any type of network familiar to those skilled in the art that can support data communications using any of a variety of commercially-available protocols, including without limitation, TCP/IP (transmission control protocol/Internet protocol), SNA (systems network architecture), IPX (Internet packet exchange), Secure Sockets Layer (SSL) or Transport Layer Security (TLS) protocols, Hyper Text Transfer Protocol (HTTP) and Secure Hyper Text Transfer Protocol (HTTPS), and the like. Merely by way of example, network(s) 220 may be local area networks (LAN), such as one based on Ethernet, Token-Ring and/or the like. Network(s) 220 also may be wide-area networks, such as the Internet. Networks 220 may include telecommunication networks such as a public switched telephone networks (PSTNs), or virtual networks such as an intranet or an extranet. Infrared and wireless networks (e.g., using the Institute of Electrical and Electronics (IEEE) 802.11 protocol suite or other wireless protocols) also may be included in networks 220.

Computing environment 200 also may include one or more data stores 210 and/or back-end servers 212. In certain examples, the data stores 210 may correspond to data store server(s) 104 discussed above in FIG. 1, and back-end servers 212 may correspond to the various back-end servers 112-116. Data stores 210 and servers 212 may reside in the same datacenter or may operate at a remote location from server 202. In some cases, one or more data stores 210 may reside on a non-transitory storage medium within the server 202. Other data stores 210 and back-end servers 212 may be remote from server 202 and configured to communicate with server 202 via one or more networks 220. In certain embodiments, data stores 210 and back-end servers 212 may reside in a storage-area network (SAN).

Figure 3:
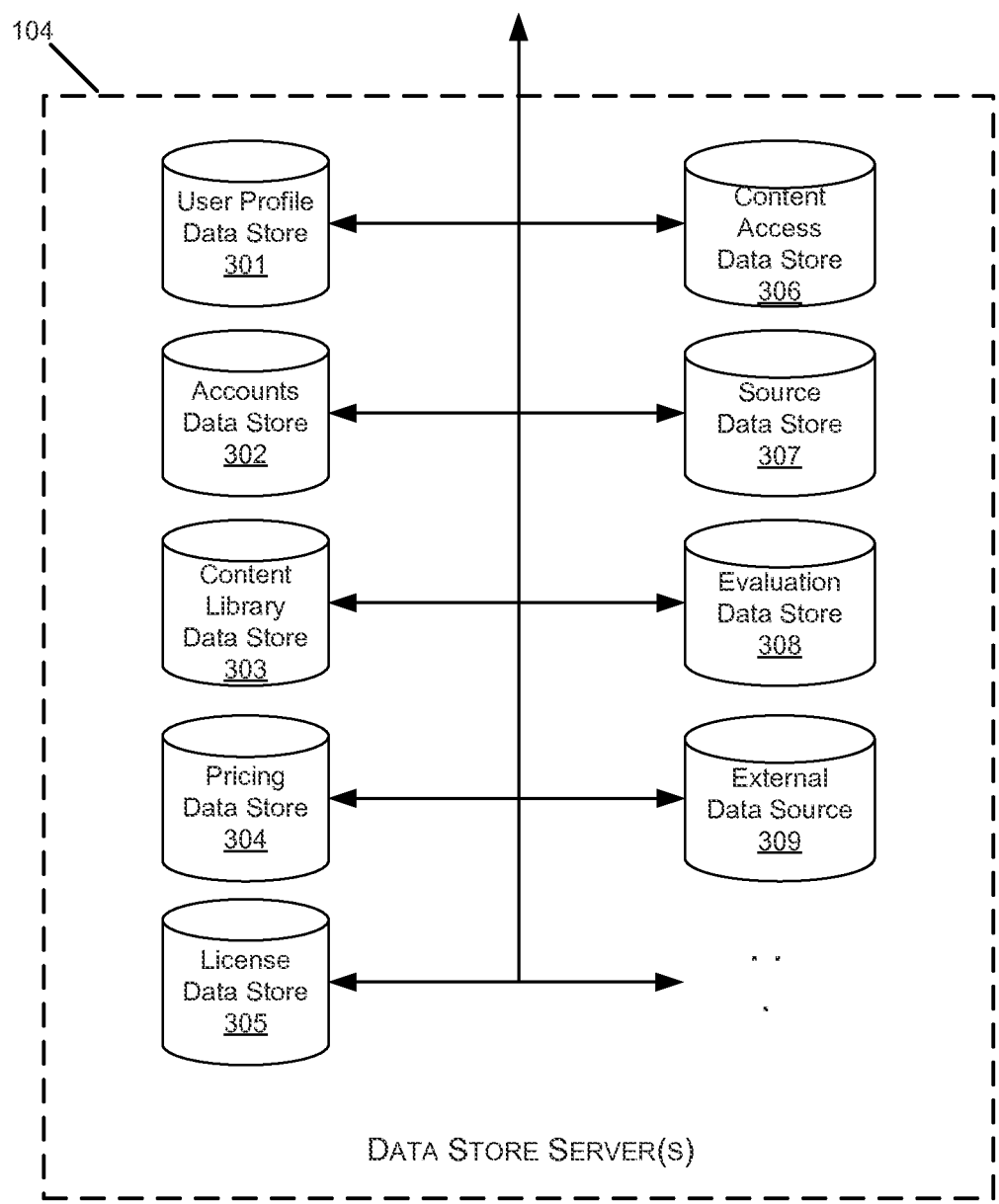
FIG. 3 is a block diagram illustrating an embodiment of one or more data store servers within a content distribution network.

With reference to FIG. 3, an illustrative set of data stores and/or data store servers is shown, corresponding to the data store servers 104 of the content distribution network 100 discussed above in FIG. 1. One or more individual data stores 301-309 may reside in storage on a single computer server 104 (or a single server farm or cluster) under the control of a single entity, or may reside on separate servers operated by different entities and/or at remote locations. In some embodiments, data stores 301-309 may be accessed by the content management server 102 and/or other devices and servers within the network 100 (e.g., user devices 106, supervisor devices 110, administrator servers 116, etc.). Access to one or more of the data stores 301-309 may be limited or denied based on the processes, user credentials, and/or devices attempting to interact with the data store.

In one instance, some or all of data stores 301-309 reside in storage on a remote server 104 and a corresponding data store for each of at least one of data stores 301-309 or another data store reside in a relay device. Thus, the relay device may receive data from the remote server and store the data locally (e.g., to facilitate subsequent transmission to a user device). Similarly, a corresponding data store for at least one of data stores 301-309 or another data store may reside at a user device 106. For example, a content management server 102 may provide select data from evaluation data store 308 to a relay device (which can store the data in a corresponding data store), which can transmit some or all of the data to a user device.

The paragraphs below describe examples of specific data stores that may be implemented within some embodiments of a content distribution network 100. It should be understood that the below descriptions of data stores 301-309, including their functionality and types of data stored therein, are illustrative and non-limiting. Data stores server architecture, design, and the execution of specific data stores 301-309 may depend on the context, size, and functional requirements of a content distribution network 100. For example, in content distribution systems 100 used for professional training and educational purposes, separate databases or file-based storage systems may be implemented in data store server(s) 104 to store trainee and/or student data, trainer and/or professor data, training module data and content descriptions, training results, evaluation data, and the like. In contrast, in content distribution systems 100 used for media distribution from content providers to subscribers, separate data stores may be implemented in data stores server(s) 104 to store listings of available content titles and descriptions, content title usage statistics, subscriber profiles, account data, payment data, network usage statistics, etc.

A user profile data store 301 may include information relating to the end users within the content distribution network 100. This information may include user characteristics such as the user names, access credentials (e.g., logins and passwords), user preferences, and information relating to any previous user interactions within the content distribution network 100 (e.g., requested content, posted content, content modules completed, training scores or evaluations, other associated users, etc.).

An accounts data store 302 may generate and store account data for different users in various roles within the content distribution network 100. For example, accounts may be created in an accounts data store 302 for individual end users, supervisors, administrator users, and entities such as companies or educational institutions. Account data may include account types, current account status, account characteristics, and any parameters, limits, restrictions associated with the accounts.

A content library data store 303 may include information describing the individual content items (or content resources) available via the content distribution network 100. In some embodiments, the library data store 303 may include metadata, properties, and other characteristics associated with the content resources stored in the content server 112. Such data may identify one or more aspects or content attributes of the associated content resources, for example, subject matter, access level, or skill level of the content resources, license attributes of the content resources (e.g., any limitations and/or restrictions on the licensable use and/or distribution of the content resource), price attributes of the content resources (e.g., a price and/or price structure for determining a payment amount for use or distribution of the content resource), rating attributes for the content resources (e.g., data indicating the evaluation or effectiveness of the content resource), and the like. In some embodiments, the library data store 303 may be configured to allow updating of content metadata or properties, and to allow the addition and/or removal of information relating to the content resources.

A pricing data store 304 may include pricing information and/or pricing structures for determining payment amounts for providing access to the content distribution network 100 and/or the individual content resources within the network 100. In some cases, pricing may be determined based on a user's access to the content distribution network 100, for example, a time-based subscription fee, or pricing based on network usage and. In other cases, pricing may be tied to specific content resources. Certain content resources may have associated pricing information, whereas other pricing determinations may be based on the resources accessed, the profiles and/or accounts of the user, and the desired level of access (e.g., duration of access, network speed, etc.). Additionally, the pricing data store 304 may include information relating to compilation pricing for groups of content resources, such as group prices and/or price structures for groupings of resources.

A license data store 305 may include information relating to licenses and/or licensing of the content resources within the content distribution network 100. For example, the license data store 305 may identify licenses and licensing terms for individual content resources and/or compilations of content resources in the content server 112, the rights holders for the content resources, and/or common or large-scale right holder information such as contact information for rights holders of content not included in the content server 112.

A content access data store 306 may include access rights and security information for the content distribution network 100 and specific content resources. For example, the content access data store 306 may include login information (e.g., user identifiers, logins, passwords, etc.) that can be verified during user login attempts to the network 100. The content access data store 306 also may be used to store assigned user roles and/or user levels of access. For example, a user's access level may correspond to the sets of content resources and/or the client or server applications that the user is permitted to access. Certain users may be permitted or denied access to certain applications and resources based on their subscription level, training program, course/grade level, etc. Certain users may have supervisory access over one or more end users, allowing the supervisor to access all or portions of the end user's content, activities, evaluations, etc. Additionally, certain users may have administrative access over some users and/or some applications in the content management network 100, allowing such users to add and remove user accounts, modify user access permissions, perform maintenance updates on software and servers, etc.

A source data store 307 may include information relating to the source of the content resources available via the content distribution network. For example, a source data store 307 may identify the authors and originating devices of content resources, previous pieces of data and/or groups of data originating from the same authors or originating devices, and the like.

An evaluation data store 308 may include information used to direct the evaluation of users and content resources in the content management network 100. In some embodiments, the evaluation data store 308 may contain, for example, the analysis criteria and the analysis guidelines for evaluating users (e.g., trainees/students, gaming users, media content consumers, etc.) and/or for evaluating the content resources in the network 100. The evaluation data store 308 also may include information relating to evaluation processing tasks, for example, the identification of users and user devices 106 that have received certain content resources or accessed certain applications, the status of evaluations or evaluation histories for content resources, users, or applications, and the like. Evaluation criteria may be stored in the evaluation data store 308 including data and/or instructions in the form of one or several electronic rubrics or scoring guides for use in the evaluation of the content, users, or applications. The evaluation data store 308 also may include past evaluations and/or evaluation analyses for users, content, and applications, including relative rankings, characterizations, explanations, and the like.

In addition to the illustrative data stores described above, data store server(s) 104 (e.g., database servers, file-based storage servers, etc.) may include one or more external data aggregators 309. External data aggregators 309 may include third-party data sources accessible to the content management network 100, but not maintained by the content management network 100. External data aggregators 309 may include any electronic information source relating to the users, content resources, or applications of the content distribution network 100. For example, external data aggregators 309 may be third-party data stores containing demographic data, education related data, consumer sales data, health related data, and the like. Illustrative external data aggregators 309 may include, for example, social networking web servers, public records data stores, learning management systems, educational institution servers, business servers, consumer sales data stores, medical record data stores, etc. Data retrieved from various external data aggregators 309 may be used to verify and update user account information, suggest user content, and perform user and content evaluations.

Figure 4:
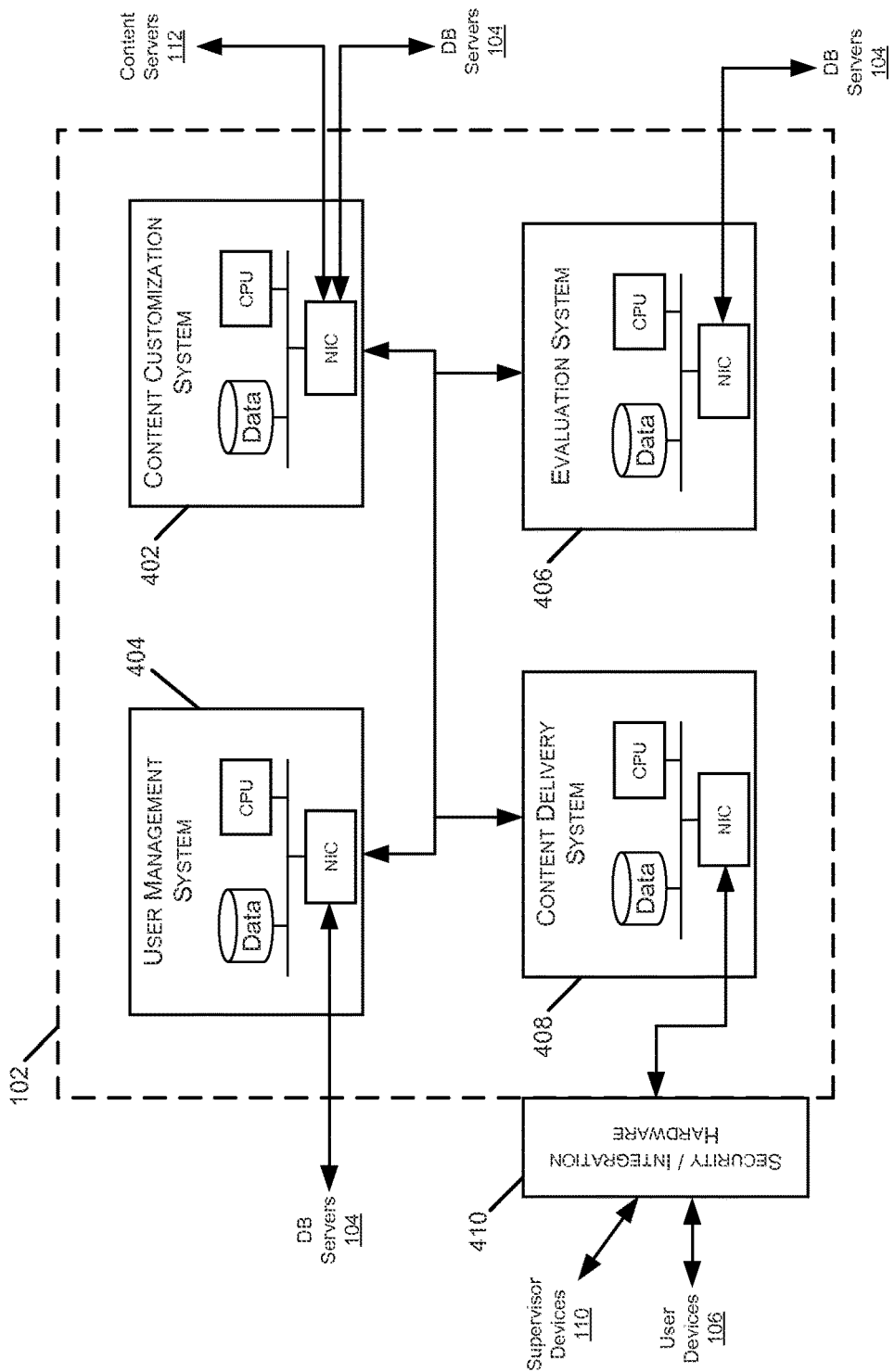
FIG. 4 is a block diagram illustrating an embodiment of one or more content management servers within a content distribution network.

With reference now to FIG. 4, a block diagram is shown illustrating an embodiment of one or more content management servers 102 within a content distribution network 100. As discussed above, content management server(s) 102 may include various server hardware and software components that manage the content resources within the content distribution network 100 and provide interactive and adaptive content to users on various user devices 106. For example, content management server(s) 102 may provide instructions to and receive information from the other devices within the content distribution network 100, in order to manage and transmit content resources, user data, and server or client applications executing within the network 100.

A content management server 102 may include a content customization system 402. The content customization system 402 may be implemented using dedicated hardware within the content distribution network 100 (e.g., a content customization server 402), or using designated hardware and software resources within a shared content management server 102.

It will be appreciated that, though FIG. 4 shows content management server 102 as including content customization system 402, user management system 404, evaluation system 406 and content delivery system 408, one or more of the systems (or corresponding or similar systems) may also or alternatively reside on a different device. For example, a user device (e.g., executing an executable file) and/or relay device may include an evaluation system, and/or a relay device may include a user management system 404 and/or content delivery system 408.

In some embodiments, the content customization system 402 may adjust the selection and adaptive capabilities of content resources to match the needs and desires of the users receiving the content. For example, the content customization system 402 may query various data stores and servers 104 to retrieve user information, such as user preferences and characteristics (e.g., from a user profile data store 301), user access restrictions to content recourses (e.g., from a content access data store 306), previous user results and content evaluations (e.g., from an evaluation data store 308), and the like. Based on the retrieved information from data stores 104 and other data sources, the content customization system 402 may modify content resources for individual users.

A content management server 102 also may include a user management system 404.

The user management system 404 may be implemented using dedicated hardware within the content distribution network 100 (e.g., a user management server 404), or using designated hardware and software resources within a shared content management server 102. In some embodiments, the user management system 404 may monitor the progress of users through various types of content resources and groups, such as media compilations, courses or curriculums in training or educational contexts, interactive gaming environments, and the like. For example, the user management system 404 may query one or more databases and/or data store servers 104 to retrieve user data such as associated content compilations or programs, content completion status, user goals, results, and the like.

A content management server 102 also may include an evaluation system 406. The evaluation system 406 may be implemented using dedicated hardware within the content distribution network 100 (e.g., an evaluation server 406), or using designated hardware and software resources within a shared content management server 102. The evaluation system 406 may be configured to receive and analyze information from user devices 106. For example, various ratings of content resources submitted by users may be compiled and analyzed, and then stored in a data store (e.g., a content library data store 303 and/or evaluation data store 308) associated with the content. In some embodiments, the evaluation server 406 may analyze the information to determine the effectiveness or appropriateness of content resources with, for example, a subject matter, an age group, a skill level, or the like. In some embodiments, the evaluation system 406 may provide updates to the content customization system 402 or the user management system 404, with the attributes of one or more content resources or groups of resources within the network 100. The evaluation system 406 also may receive and analyze user evaluation data from user devices 106, supervisor devices 110, and administrator servers 116, etc. For instance, evaluation system 406 may receive, aggregate, and analyze user evaluation data for different types of users (e.g., end users, supervisors, administrators, etc.) in different contexts (e.g., media consumer ratings, trainee or student comprehension levels, teacher effectiveness levels, gamer skill levels, etc.).

A content management server 102 also may include a content delivery system 408. The content delivery system 408 may be implemented using dedicated hardware within the content distribution network 100 (e.g., a content delivery server 408), or using designated hardware and software resources within a shared content management server 102. The content delivery system 408 may receive content resources from the content customization system 402 and/or from the user management system 404, and provide the resources to user devices 106. The content delivery system 408 may determine the appropriate presentation format for the content resources based on the user characteristics and preferences, and/or the device capabilities of user devices 106. If needed, the content delivery system 408 may convert the content resources to the appropriate presentation format and/or compress the content before transmission. In some embodiments, the content delivery system 408 may also determine the appropriate transmission media and communication protocols for transmission of the content resources.

In some embodiments, the content delivery system 408 may include specialized security and integration hardware 410, along with corresponding software components to implement the appropriate security features content transmission and storage, to provide the supported network and client access models, and to support the performance and scalability requirements of the network 100. The security and integration layer 410 may include some or all of the security and integration components 208 discussed above in FIG. 2, and may control the transmission of content resources and other data, as well as the receipt of requests and content interactions, to and from the user devices 106, supervisor devices 110, administrative servers 116, and other devices in the network 100.

Figure 5:
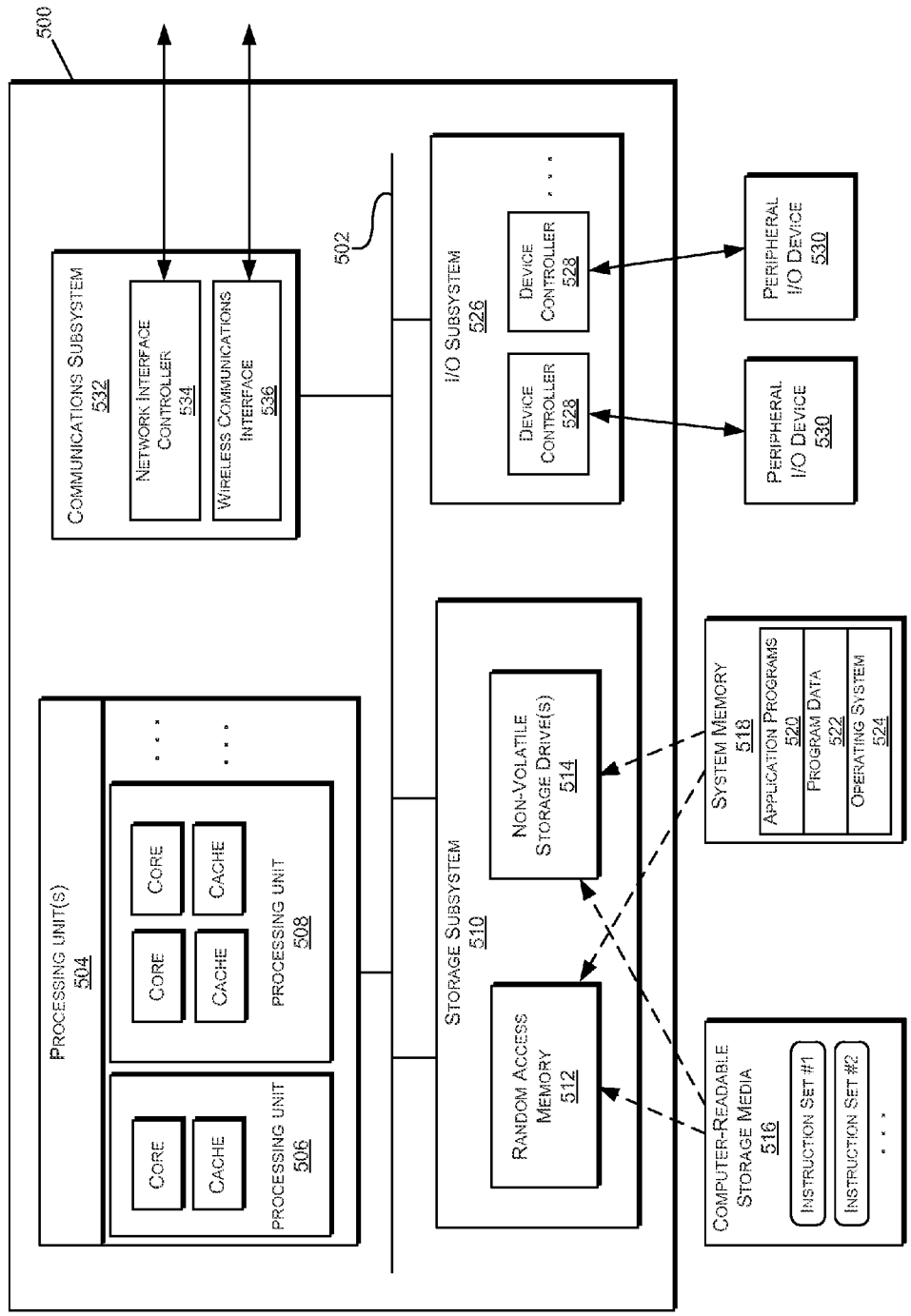
FIG. 5 is a block diagram illustrating the physical and logical components of a special-purpose computer device within a content distribution network.

With reference now to FIG. 5, a block diagram of an illustrative computer system is shown. The system 500 may correspond to any of the computing devices or servers of the content distribution network 100 described above, or any other computing devices described herein. In this example, computer system 500 includes processing units 504 that communicate with a number of peripheral subsystems via a bus subsystem 502. These peripheral subsystems include, for example, a storage subsystem 510, an I/O subsystem 526, and a communications sub system 532.

Bus subsystem 502 provides a mechanism for letting the various components and subsystems of computer system 500 communicate with each other as intended. Although bus subsystem 502 is shown schematically as a single bus, alternative embodiments of the bus subsystem may utilize multiple buses. Bus subsystem 502 may be any of several types of bus structures including a memory bus or memory controller, a peripheral bus, and a local bus using any of a variety of bus architectures. Such architectures may include, for example, an Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus, which can be implemented as a Mezzanine bus manufactured to the IEEE P1386.1 standard.

Processing unit 504, which may be implemented as one or more integrated circuits (e.g., a conventional microprocessor or microcontroller), controls the operation of computer system 500. One or more processors, including single core and/or multicore processors, may be included in processing unit 504. As shown in the figure, processing unit 504 may be implemented as one or more independent processing units 506 and/or 508 with single or multicore processors and processor caches included in each processing unit. In other embodiments, processing unit 504 may also be implemented as a quad-core processing unit or larger multicore designs (e.g., hexa-core processors, octo-core processors, ten-core processors, or greater.

Processing unit 504 may execute a variety of software processes embodied in program code, and may maintain multiple concurrently executing programs or processes. At any given time, some or all of the program code to be executed can be resident in processor(s) 504 and/or in storage subsystem 510. In some embodiments, computer system 500 may include one or more specialized processors, such as digital signal processors (DSPs), outboard processors, graphics processors, application-specific processors, and/or the like.

I/O subsystem 526 may include device controllers 528 for one or more user interface input devices and/or user interface output devices 530. User interface input and output devices 530 may be integral with the computer system 500 (e.g., integrated audio/video systems, and/or touchscreen displays), or may be separate peripheral devices which are attachable/detachable from the computer system 500.

Input devices 530 may include a keyboard, pointing devices such as a mouse or trackball, a touchpad or touch screen incorporated into a display, a scroll wheel, a click wheel, a dial, a button, a switch, a keypad, audio input devices with voice command recognition systems, microphones, and other types of input devices. Input devices 530 may also include three dimensional (3D) mice, joysticks or pointing sticks, gamepads and graphic tablets, and audio/visual devices such as speakers, digital cameras, digital camcorders, portable media players, webcams, image scanners, fingerprint scanners, barcode reader 3D scanners, 3D printers, laser rangefinders, and eye gaze tracking devices. Additional input devices 530 may include, for example, motion sensing and/or gesture recognition devices that enable users to control and interact with an input device through a natural user interface using gestures and spoken commands, eye gesture recognition devices that detect eye activity from users and transform the eye gestures as input into an input device, voice recognition sensing devices that enable users to interact with voice recognition systems through voice commands, medical imaging input devices, MIDI keyboards, digital musical instruments, and the like.

Output devices 530 may include one or more display subsystems, indicator lights, or non-visual displays such as audio output devices, etc. Display subsystems may include, for example, cathode ray tube (CRT) displays, flat-panel devices, such as those using a liquid crystal display (LCD) or plasma display, projection devices, touch screens, and the like. In general, use of the term "output device" is intended to include all possible types of devices and mechanisms for outputting information from computer system 500 to a user or other computer. For example, output devices 530 may include, without limitation, a variety of display devices that visually convey text, graphics and audio/video information such as monitors, printers, speakers, headphones, automotive navigation systems, plotters, voice output devices, and modems.

Computer system 500 may comprise one or more storage subsystems 510, comprising hardware and software components used for storing data and program instructions, such as system memory 518 and computer-readable storage media 516. The system memory 518 and/or computer-readable storage media 516 may store program instructions that are loadable and executable on processing units 504, as well as data generated during the execution of these programs.

Depending on the configuration and type of computer system 500, system memory 318 may be stored in volatile memory (such as random access memory (RAM) 512) and/or in non-volatile storage drives 514 (such as read-only memory (ROM), flash memory, etc.) The RAM 512 may contain data and/or program modules that are immediately accessible to and/or presently being operated and executed by processing units 504. In some implementations, system memory 518 may include multiple different types of memory, such as static random access memory (SRAM) or dynamic random access memory (DRAM). In some implementations, a basic input/output system (BIOS), containing the basic routines that help to transfer information between elements within computer system 500, such as during start-up, may typically be stored in the non-volatile storage drives 514. By way of example, and not limitation, system memory 518 may include application programs 520, such as client applications, Web browsers, mid-tier applications, server applications, etc., program data 522, and an operating system 524.

Storage subsystem 510 also may provide one or more tangible computer-readable storage media 516 for storing the basic programming and data constructs that provide the functionality of some embodiments. Software (programs, code modules, instructions) that when executed by a processor provide the functionality described herein may be stored in storage subsystem 510. These software modules or instructions may be executed by processing units 504. Storage subsystem 510 may also provide a repository for storing data used in accordance with the present invention.

Storage subsystem 300 may also include a computer-readable storage media reader that can further be connected to computer-readable storage media 516. Together and, optionally, in combination with system memory 518, computer-readable storage media 516 may comprehensively represent remote, local, fixed, and/or removable storage devices plus storage media for temporarily and/or more permanently containing, storing, transmitting, and retrieving computer-readable information.

Computer-readable storage media 516 containing program code, or portions of program code, may include any appropriate media known or used in the art, including storage media and communication media, such as but not limited to, volatile and non-volatile, removable and non-removable media implemented in any method or technology for storage and/or transmission of information. This can include tangible computer-readable storage media such as RAM, ROM, electronically erasable programmable ROM (EEPROM), flash memory or other memory technology, CD-ROM, digital versatile disk (DVD), or other optical storage, magnetic cassettes, magnetic tape, magnetic disk storage or other magnetic storage devices, or other tangible computer readable media. This can also include nontangible computer-readable media, such as data signals, data transmissions, or any other medium which can be used to transmit the desired information and which can be accessed by computer system 500.

By way of example, computer-readable storage media 516 may include a hard disk drive that reads from or writes to non-removable, nonvolatile magnetic media, a magnetic disk drive that reads from or writes to a removable, non-volatile magnetic disk, and an optical disk drive that reads from or writes to a removable, nonvolatile optical disk such as a CD ROM, DVD, and Blu-Ray® disk, or other optical media. Computer-readable storage media 516 may include, but is not limited to, Zip® drives, flash memory cards, universal serial bus (USB) flash drives, secure digital (SD) cards, DVD disks, digital video tape, and the like. Computer-readable storage media 516 may also include, solid-state drives (SSD) based on non-volatile memory such as flash-memory based SSDs, enterprise flash drives, solid state ROM, and the like, SSDs based on volatile memory such as solid state RAM, dynamic RAM, static RAM, DRAM-based SSDs, magnetoresistive RAM (MRAM) SSDs, and hybrid SSDs that use a combination of DRAM and flash memory based SSDs. The disk drives and their associated computer-readable media may provide non-volatile storage of computer-readable instructions, data structures, program modules, and other data for computer system 500.

Communications subsystem 532 may provide a communication interface from computer system 500 and external computing devices via one or more communication networks, including local area networks (LANs), wide area networks (WANs) (e.g., the Internet), and various wireless telecommunications networks. As illustrated in FIG. 5, the communications subsystem 532 may include, for example, one or more network interface controllers (NICs) 534, such as Ethernet cards, Asynchronous Transfer Mode NICs, Token Ring NICs, and the like, as well as one or more wireless communications interfaces 536, such as wireless network interface controllers (WNICs), wireless network adapters, and the like. Additionally and/or alternatively, the communications subsystem 532 may include one or more modems (telephone, satellite, cable, ISDN), synchronous or asynchronous digital subscriber line (DSL) units, FireWire® interfaces, USBC® interfaces, and the like. Communications subsystem 536 also may include radio frequency (RF) transceiver components for accessing wireless voice and/or data networks (e.g., using cellular telephone technology, advanced data network technology, such as 3G, 4G or EDGE (enhanced data rates for global evolution), WiFi (IEEE 802.11 family standards, or other mobile communication technologies, or any combination thereof), global positioning system (GPS) receiver components, and/or other components.

The various physical components of the communications subsystem 532 may be detachable components coupled to the computer system 500 via a computer network, a FireWire® bus, or the like, and/or may be physically integrated onto a motherboard of the computer system 500. Communications subsystem 532 also may be implemented in whole or in part by software.

In some embodiments, communications subsystem 532 may also receive input communication in the form of structured and/or unstructured data feeds, event streams, event updates, and the like, on behalf of one or more users who may use or access computer system 500. For example, communications subsystem 532 may be configured to receive data feeds in real-time from users of social networks and/or other communication services, web feeds such as Rich Site Summary (RSS) feeds, and/or real-time updates from one or more third party information sources (e.g., data aggregators 309). Additionally, communications subsystem 532 may be configured to receive data in the form of continuous data streams, which may include event streams of real-time events and/or event updates (e.g., sensor data applications, financial tickers, network performance measuring tools, clickstream analysis tools, automobile traffic monitoring, etc.). Communications subsystem 532 may output such structured and/or unstructured data feeds, event streams, event updates, and the like to one or more data stores 104 that may be in communication with one or more streaming data source computers coupled to computer system 500.

Due to the ever-changing nature of computers and networks, the description of computer system 500 depicted in the figure is intended only as a specific example. Many other configurations having more or fewer components than the system depicted in the figure are possible. For example, customized hardware might also be used and/or particular elements might be implemented in hardware, firmware, software, or a combination. Further, connection to other computing devices, such as network input/output devices, may be employed. Based on the disclosure and teachings provided herein, a person of ordinary skill in the art will appreciate other ways and/or methods to implement the various embodiments.

Figure 6:
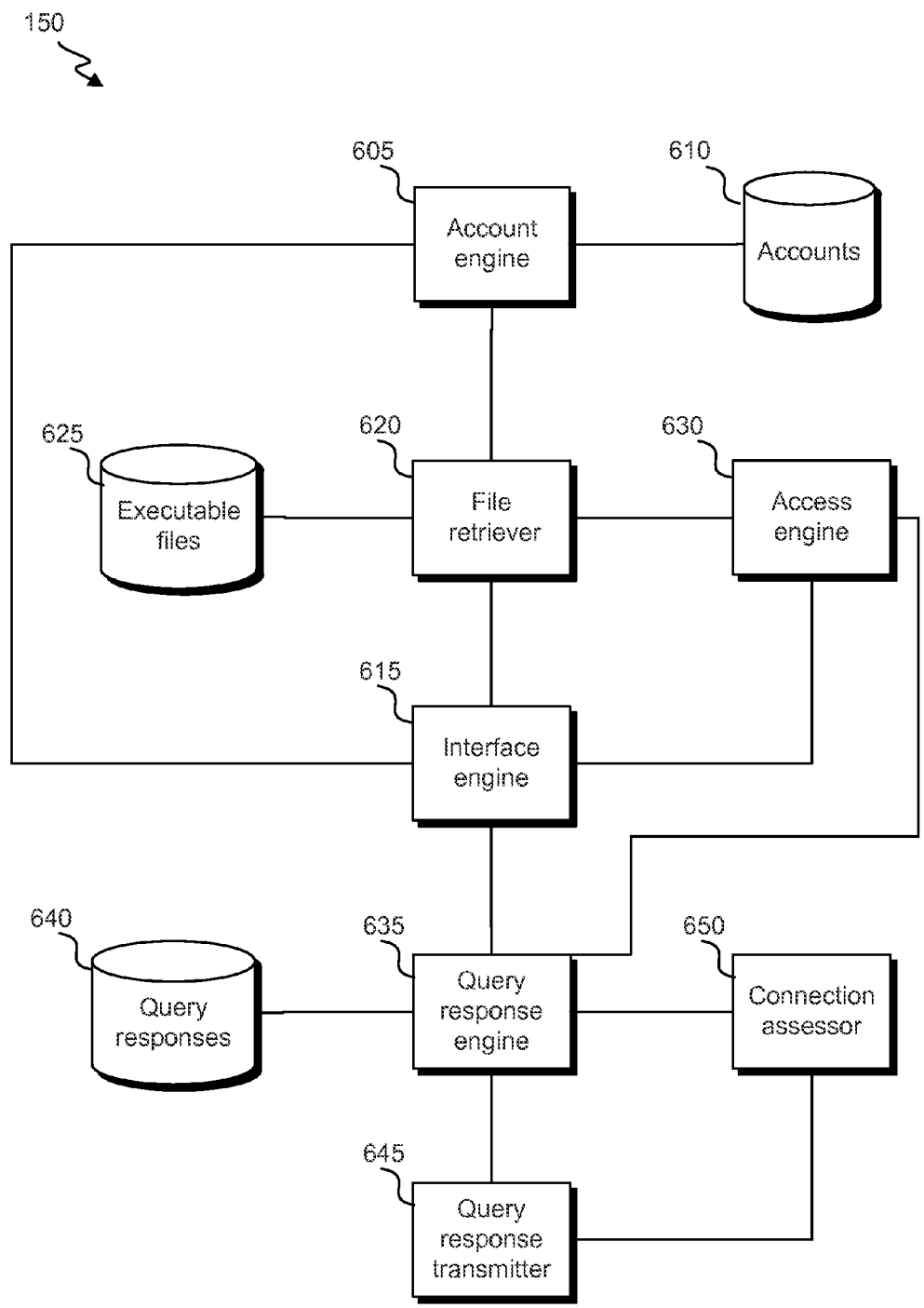
FIG. 6 depicts a block diagram of an embodiment of an query management system.

Referring next to FIG. 6, a block diagram of an embodiment of query management system 150 is shown. Query management system 150 can be, in part or in its entirety, in the cloud. In some instances, at least part of query management system 150 is present on a device, such as a user device 106 or a relay device. Query management system 150 can include a distributed system (e.g., part residing in content management server 102 and part on user device 106, part residing in the cloud and part on user device 106, part residing in content management server 102 and part on a relay device and part on user device 106, etc.). Further, it will be appreciated that each of one or more components of query management system 150 may reside on multiple devices. For example, each of a relay device and user device 106 may include an account engine 605 to verify an identity of a proctor and user, respectively, and each device may further include an interface engine 615 to receive inputs and present outputs. The operation of a given component may depend upon the type of device.

Query management system 150 includes an account engine 605, which generates and maintains accounts for proctors and/or users and verifies identities of proctors (e.g., interacting with a relay device) and/or users. Account engine 605 can collect, e.g., personal (e.g., name, email address, residence address, telephone number and occupation), academic (e.g., grade level, current grade, school, one or more teachers, interests, course history, and course enrollment), and/or login (e.g., username and password) information. Account information can be stored in account data store 610.

Further, account engine 605 can characterize a system-accessing party as a particular user or proctor (e.g., based on a login name or device identifier) and can verify an identity of the party by, e.g., ensuring that information entered by the party (e.g., login information) matches that in a stored account.

Account engine 605 can interact with an interface engine 615 during account generation and/or account verification to receive account information, to identify an account and/or to receive information to allow for account access.

A file retriever 620 can retrieve one or more executable files from a content management server 102 or relay device. In one instance, a power file that includes a set of executable files can be retrieved. The executable file(s) can be pushed from a sending device (content management server 102 or relay device) or pulled by a retrieving device (relay device or user device 106). The executable file(s) can be retrieved at a set time or when a condition is satisfied. For example, the executable file(s) can be retrieved when it is less than a threshold time before a start time and an a registered proctor or user is logged into a retrieving relay device or user device. As another example, the executable file(s) can be retrieved when input is provided that corresponds to a request to retrieve the executable file(s).

After the executable file(s) are retrieved, file retriever 620 can decrypt and/or decompress the executable file(s). Such actions can be performed immediately or at a later time, such as prior to transmitting the files to another device or to executing a file. One or more executable files (or a power file including the executable files) can be stored in an executable-file data store 625. The executable files can be stored in association with a course identifier, a start time, and/or information indicating which devices or parties are allowed to access the files.

In some instances, a file retriever 620 on a relay device initially retrieves one or more executable files (e.g., compressed into a power file) from a central server (e.g., content management server 102). This initial retrieval can be performed in advance of a start time. The executable files can then be cached in executable-file data store 625 on the relay device. a file retriever 620 on a user device can subsequently retrieve one or more executable files from the relay device. The subsequent retrieval can be performed at a start time or shortly before. This two-part retrieval technique can reduce a system load on a central server and can further reduce dependence on network connectivity. For example, user devices may be connected via a wired connection to a relay device, such that the second retrieval would not depend on a strength of a wireless connection.

Access engine 630 can evaluate one or more conditions to determine whether an executable file can be retrieved, decrypted, decompressed, executed or otherwise accessed. Evaluation of the conditions can include evaluating a current time, an identified party (e.g., one logged into a device), an input (e.g., whether a party has interred input corresponding to a request to retrieve executable files or to begin can exam), etc. For example, access engine 630 can allow exam-file retrieval upon receiving input from a user corresponding to a request to retrieve the executable file and upon verifying that a current time is within a prescribed time window from a start time (e.g., a time at which an executable file is to be executed; a series of queries is to be presented and/or an examination is to begin or be presented). It will be appreciated that a condition applicable to executable file retrieval, decryption, decompression, or execution can differ from a condition applicable to another of these actions.

An access engine 630 on a user device can identify one or more executable files to execute or read. This selection can be based on an analysis of software installed on a user device, hardware or resources on the user device or one or more applications open on the user device. For example, access engine 630 can identify a browser that is open on the user device or one that is identified as being a preferred browser for that device. Access engine 630 can then identify one or more executable files compatible with that browser.

Upon detecting satisfaction and exam-initiation condition, access engine 630 can execute one or more executable files. The execution can cause the user device to be partly locked, such that the user's access to one or more applications is limited or blocked. The extent of such locking can be common across exams or can be determined based on an executable file variable (e.g., such that an instructor can identify applications that the user can access during the exam). The locking may extend to the same browser that the user is using to access the exam. Thus, for example, executable file questions may be presented in a tab in a browser, but the user may be prevented from opening a new tab or accessing Internet content using the browser. The prevention may occur by changing responses to traditional inputs (e.g., such that a control-T command has no effect, produces an error or pauses or ends in exam).

Execution of one or more executable files can cause one or more executable file queries (or questions) to be presented on a user device via interface engine 615. In some instances, executable file questions can be presented on a screen of a user device using a browser that had been open prior to the executable file initiation. In some instances, the presentation can further include a set of potential responses or answers. In some instances, the presentation can include a text box where a user can enter a short answer or an essay response. In one instance, executable file questions are presented one at the time. Thus, for example, a second executable file question may be presented only once a response to a first executable file question has been received or a user has indicated that the first executable file question is to be skipped. In one instance, a set of executable file questions (e.g., all executable file questions) are simultaneously presented. When a presentation of the set of executable file questions extends beyond a viewable portion of a page (e.g., in a browser), a user may view individual executable file questions by scrolling through the page.

Interface engine 615 can receive inputs from a user during an executable file period. The inputs can include text, a selection (e.g., between multiple answer options) or other inputs indicative of a response to an executable file question. In some instances, an input can further indicate whether a response is to be treated as final (e.g., a selection of a "submit" button). Such indication can be associated with a single response or a set of responses (e.g. multiple responses or all responses for an exam). In some instances, a response is determined to be final regardless of such explicit indication.

A query response engine 635 can map response inputs to responses for particular questions. For example, query response engine 635 can determine that a particular response corresponds to a selection of answer choice D. As another example, query response engine 635 can determine that a particular response corresponds to a correct answer choice. As another example, query response engine 635 can associate a text response with question number 9. Query response engine 635 can generate a response file that includes response data for each response or for a set of responses (e.g., all responses for an executable file or subset thereof). The response file can include one or more of: an identifier of a corresponding user or user device, the time at which the response was received, an answer corresponding to the response, the response itself, an indication as to whether the response was correct, an application used to view a corresponding question or to provide the response and other information. The response file can be generated upon receiving one or more responses, prior to transmitting one or more responses, at an end time, prior to storing one or more responses (e.g., in long-term memory). The response file can be encrypted or otherwise securely stored.

Query response engine 635 can store each response (e.g., by storing a response file) in query-response data store 640 and/or can transmit each response (e.g., by transmitting a response file) via query response transmitter 645 to a relay device or central server. The response may be stored in a locked or an unlocked configuration. Storing a response in locked configuration may include, for example, storing the response as read-only data (e.g., to a ROM chip), whereas storing a response in an unlocked configuration may include storing the response as read-write data (e.g., to a RAM chip). A locked configuration may further or alternatively be associated with a query-presentation configuration that restricts or prevents a corresponding query from being subsequently presented. A response may be stored in a locked configuration, for example, when a submission input (e.g., corresponding to a particular question, question set or exam) is received, a threshold number or at least a threshold number of responses have been identified (e.g., in total or since a previous response locking), a threshold time or at least a threshold time has passed (e.g., since a start time or a previous response locking), a query selection or customization has been performed based on the response and/or the response has been transmitted. The locking configuration can facilitate adaptive query generation.

Responses can be transmitted individually or in sets. In some instances, whether responses are locally stored or how responses are stored (e.g., whether in short-term memory or long-term memory or whether the responses are stored in a locked configuration) depends on whether the responses are being or has been transmitted or whether transmission was successful. For example, responses may be stored in long-term memory only when responses of not been successfully transmitted to a relay device or central server.

In some instances, a response is stored in an unlocked configuration and is also transmitted (e.g., to a relay device). If the response is later modified, the modified response may then be subsequently transmitted.

In one instance, a transmission of one or more responses is attempted upon receipt of the responses or an indication that the responses of time. In one instance, the transmission is conditioned upon other circumstances. A condition can depend upon a connection availability or strength or other factors (e.g., a previous transmission success/failure, a processing load on a user device, etc.).

A connection assessor 650 can identify a value of a connection variable (e.g., an availability of a connection or strength of a connection) and use this value to determine whether transmission should be attempted. The evaluation can include, for example, determining whether a user device is connected via a wired connection to another device, evaluating whether a wireless connection is available, evaluating a strength of a wireless connection, evaluating the success/failure of a test transmission or previous transmission (e.g., based on whether a success receipt confirmation was received from a receiving device), etc. In one instance, the value of the connection variable as compared to a threshold set forth in the transmission condition, such that the transmission is to be attempted when the value exceeds a threshold (e.g., a zero threshold, non-zero threshold or a threshold that is greater than one).

Thus, for example, a handling of a first request may differ from a handling of a second request. To illustrate, a first request can be automatically transmitted to a relay device upon determining that a satisfactory wireless connection is available, while a second request can be stored instead of being transmitted upon determining that no satisfactory wireless connection is available.

The conditioned transmission can lead to circumstances where responses are locally stored beyond the time at which they were finalized, beyond an end time (e.g., a time at which responses are no longer to be accepted, queries are no longer to be presented, a defined time or an end of a defined time period), etc. This may occur due to a previous failure to satisfy transmission condition or a previous transmission failure. Condition assessor 650 can then continue to monitor a connection variable and evaluate the transmission condition to determine when a transmission of the stored responses can be attempted. This subsequent evaluation can occur at a prescribed time interval from a past evaluation, at a prescribed time, upon receiving a request from a relay device or central server, etc. Once the condition is satisfied, query response transmitter 645 can attempt to transmit the responses (e.g., by transmitting a response file) to a relay device or central server. In some instances, query response transmitter 645 repeatedly attempts transmission (e.g., at fixed intervals) until all responses have been successfully transmitted.

It will be appreciated that, in some instances, a number of responses actually transmitted are considered for transmission (e.g., based on the assessment performed by connection assessor 650) changes. Such as change can occur due to a change in speed at which a user provides responses, a previous transmission that was unsuccessful, a previous response or set of responses that was not transmitted (e.g., due to an unsatisfactory connection), etc.

It will also be appreciated that a component of query management system 150 can be present on each of multiple types of devices (e.g., a relay device and a user device). The function of the component may be similar, the same or different depending on the device type.

Figure 7:
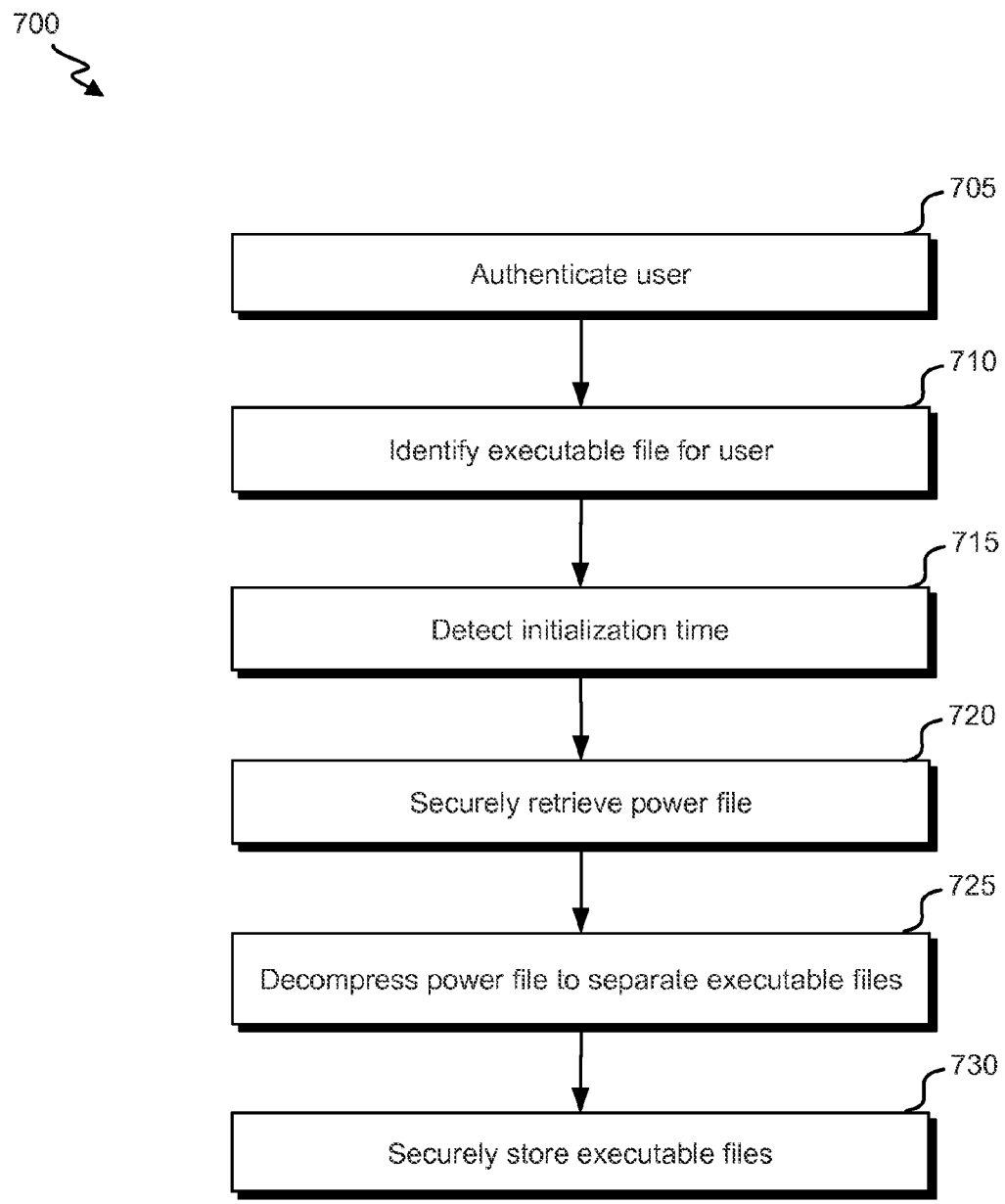
FIG. 7 illustrates a flowchart of an embodiment of a process for retrieving an power file at an electronic device.

FIG. 7 illustrates a flowchart of an embodiment of a process 700 for retrieving an power file at a user device. Part or all of process 700 can be implemented in a user device. Process 700 begins at block 705 where account engine 605 authenticates a user. The authentication can include, for example, matching one or more of the login name, a user name, a user device identifier, a user identifier, to data in a user account. The authentication can further verifying that additional information (e.g., a password or token) corresponds to data in the account or associated with the account.

File retriever 620 identifies an executable file (e.g., which may be part of a power file) or identifies a power file for the user at block 710. For example, file retriever 620 can first identify one or more courses associated with a user's account or device location. A schedule associated with each of the one or more courses can be retrieved, and a current time can be mapped to each schedule. Thus, file retriever 620 can determine whether an exam (associated with a power file) is scheduled to occur for any of the one or more courses at a current time, a current day, within a defined time period, etc. In some instances, a user submits input response to a selection or other identification of a course, exam or file.

File retriever 620 detects an initialization time at block 715. For each executable file, an initialization time or initialization time period can indicate a time at which or a time period during which executable file materials can be retrieved at a user device from a remote source. The initialization time or initialization time period may be defined for a given course for a given executable file (e.g., such that a proctor or instructor can at least partly define the initialization time or time period) or may be fixed across courses and/or exams. At block 715, file retriever 620 can detect whether a current time is subsequent to the initialization time or falls within the initialization time period.

File retriever 620 securely retrieves an power file from a relay device (or central server) at block 720. For example, file retriever 620 can send a request to the relay device for the power file. The request can include an identifier of one or more of: the user device, the user, the course, the executable file (e.g., as determined using a schedule or account data), the power file and so on. A response to the request can then be received.

In one instance, the power file includes a file that identifies one or more characteristics of other files to be included in the power file. For example, the file can identify a total number of files that are to be present in the power file, a version of each of one or more files in the power file, a size of each of one or more files in the power file (or a sum thereof), etc. A user device can then confirm that the appropriate files are received. For example, in one instance, the file identifies a version of each of one or more files to be present in the power file and/or a checksum thereof. The user device can then identify the versions of the received files, generate a checksum (e.g., according to an order prescribed in the file) and compare the generated checksum to that in the file. If it is determined that the files in the power file do not correspond to those that are to be included in the power file, an action may be taken, such as requesting the power file again or presenting a warning notification. A similar complete-transmission verification may be performed in association with a transmission of a power file from a central server to a relay device.

The power file can include a set of (e.g., compressed) executable files. One or more files in the set of files can include executable files. In some instances, at least some files in the set of files differ in terms of their compatibility. For example, one or more first files may be compatible with a first browser or piece of software and one or more second files may be compatible with a second browser or piece of software. The power file and/or executable files in the power file can be encrypted or otherwise secured (e.g., password secured).

The user device can identify a relay device (or central server) from which to retrieve or request the power file from based on, e.g., identifying a nearby relay device, identifying a relay device present on a wired connection, identifying a relay device in a same classroom, identifying a device associated with an identifier matching one associated with a course or executable file, etc.

File retriever 620 decompresses the power file at block 725. The decompression can include unzipping the power file. The decompression can serve to convert a single power file into a set of separate executable files. In some instances, decompressing the power file includes decrypting the power file. In some instances, file retriever 620 further or alternatively decrypts or partially decrypts the power file and/or one or more executable files, or such decryption (if required) may be performed in advance or at a start time. Decrypting the file can include identifying, retrieving or generating a key. For example, a power file can include an instruction identifying a technique for generating a key. The technique may include a program code that retrieves or collects data of a particular type (e.g., user identifier, device identifier, location detected by a sensor, etc.) and using (e.g., transforming) the data into a key. The key can include a public key, a private key, and/or a symmetric key. In some instances, at least part of the key is initially generated at a central server and/or remote device (e.g., using a random number generator or pseudorandom number generator to generate a (pseudo)random number which can be combined with data identifiable at a user device and/or other data (e.g., a current data). At least part of the key (e.g., the (pseudo) random component thereof) can be transmitted from the central server or relay device to the user device.

At block 730, file retriever 620 securely stores the executable files in executable-file data store 625. In some instances, file retriever 620 may encrypt or otherwise secure the executable files prior to storing them (e.g., in instances where executable files in the power file are not secure). In some instances, executable-file data store 625 as a whole a secure. The secure storage can serve to prevent a user or user device from accessing the executable files prior to a start time. In some instances, an initialization time insubstantial and the same as a start time. In such cases, block 730 can be omitted from process 700.

It will be appreciated that, in some instances, executable files are not compressed at a relay device. Thus, in some instances, block 725 may be omitted from process 700.

Figure 8:
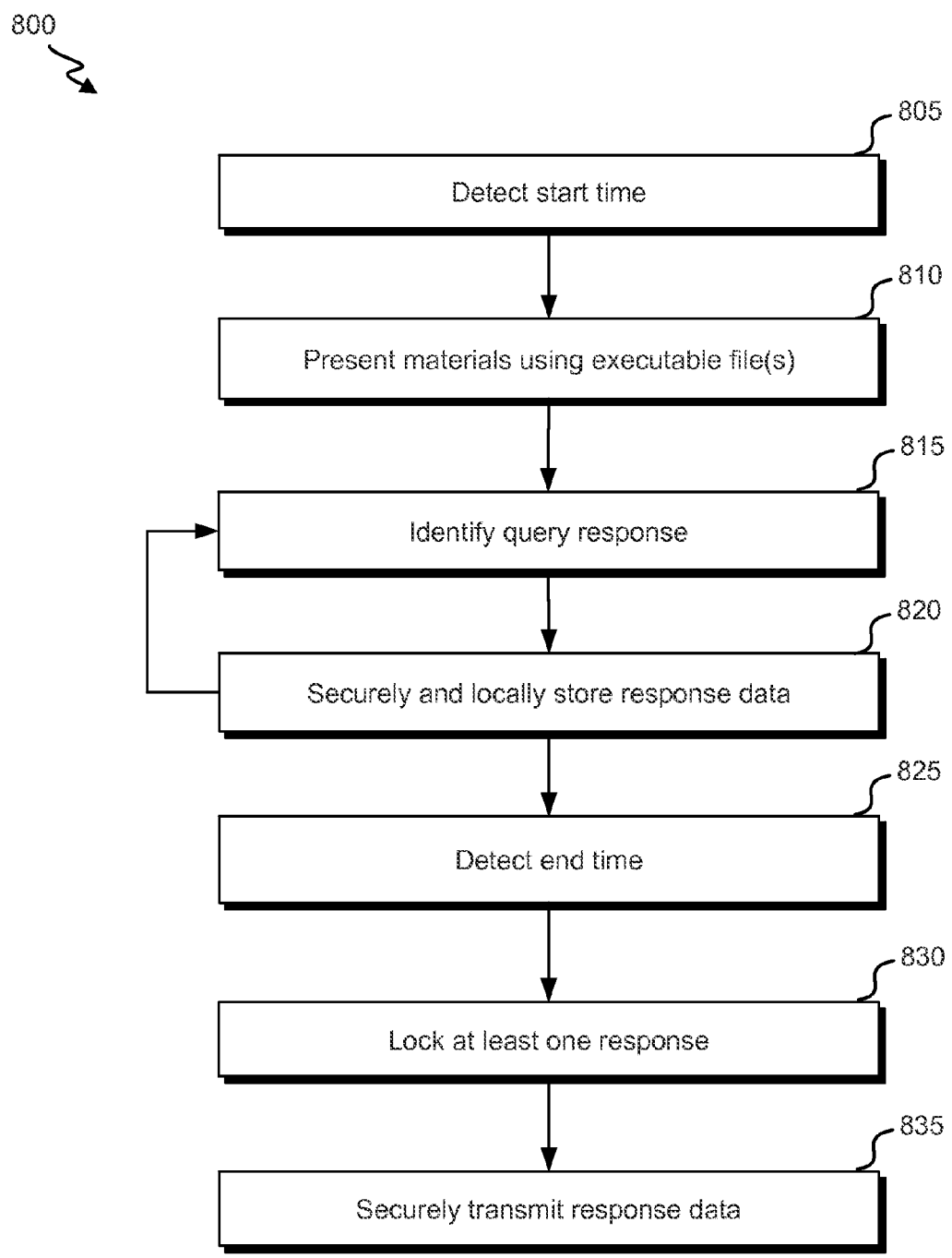
FIG. 8 illustrates a flowchart of an embodiment of a process for identifying and transmitting query responses.

FIG. 8 illustrates a flowchart of an embodiment of a process 800 for identifying and transmitting query responses. Part or all of process 800 can be implemented in a user device. Process 800 begins at block 805 where access engine 630 detects a start time. For each exam, a start time or start time period can indicate a time at which or a time period during which executable file materials can presented on a user device. The start time or start time period may be defined for a given course for a given executable file (e.g., such that a proctor or instructor can at least partly define the initialization time or time period) or may be fixed across courses and/or exams. In some instances, a start time or time period is determined based on a course time associated with a course. For example, for a 12 am course, a start time may be 12 am (on an executable file date). At block 805, access engine 630 can detect whether a current time is subsequent to the start time or falls within the start time period.

In some instances, block 805 can further include detecting whether the user has provided an explicit request or implicit request (e.g., by logging into executable file software) to begin execution of an executable file. In some instances, block 805 further includes detecting whether one or more other execution-start conditions are satisfied, such as determining whether the user has completed a pre-executable file information form (e.g., identifying the user), determining whether executable file materials are locally available, determining whether the user completed one or more pre-requisites.

Interface engine 615 presents executable file materials at block 810. The material can include a query. For example, access engine 630 can execute one or more executable files such that the executable file materials are presented. The executable file materials can include one or more queries (e.g., questions) and response (e.g., answer) opportunities (e.g., answer options, text boxes, labeling abilities, etc.). Presenting executable file materials can include presenting text, graphics, videos, audio streams, etc. Executable file materials can be simultaneously (e.g., in a single screen or page), sequentially or conditionally presented (e.g., such that a subset of executable file questions are presented at a time). Which particular question(s) are shown at a given time can depend on a question sequence, a user input (selecting a question or group of questions) and/or whether a previous response provided by the user was correct.

Interface engine 615 identifies a query response at block 815. For example, a user may enter text, select a button option or other input option (e.g., an option on a drop-down menu, a slider value, a list option, etc.), click on a location on a screen (e.g., corresponding to a location in a graphic), etc. In some instances, the user response also includes input indicating that a response is complete, input indicating that a response is finalized, a request to progress to a next question, etc.

Query response engine 635 can map the input received into response data. For example, a selection of an option can be mapped to a selection of a particular response. As another example, clicking on a screen location can be mapped to identifying a particular location within an image. As another example, entered text can be identified as a response. The response data can further associate the response with an identifier of one or more of: a question, a user, a user device, a response time, a course, an exam, and so on.

At block 820, query response engine 635 securely stores the response data in query-response data store 640. Depending on the embodiment and/or circumstances, the response data may be locked such that the user is prevented from changing the stored response. Such locking can occur unconditionally, when an executable file or course variable indicates that such locking is to occur, when a user indicates that a response is final or is submitted, and so on. Thus, in some instances, a subset of responses for a given executable file and given user may be locked while others for the same executable file and user may not.

Process 800 can return to block 815 such that additional responses can be received and stored. In some instances, process 800 returns to block 810 such that new executable file material (e.g., question(s)) can be presented.

Access engine 630 detects an end time at block 825. An end time can indicate a time at which responses are to no longer be provided or modified (e.g., are locked), executable file materials are to no longer be presented on a user device and/or response data is to be transmitted from a user device to another device. The end time may be defined for a given course for a given executable file (e.g., such that a proctor or instructor can at least partly define the initialization time or time period) or may be fixed across courses and/or exams. In some instances, the end time depends on a start time (e.g., the end time being a fixed duration after a start time). In some instances, the end time is determined at least partly based on user input. For example, a user may identify that an executable file is complete, that responses are to be submitted, etc.

Query response engine 635 locks at least one (or all) of the user's stored responses at block 830. The locking can be performed such that the user can no longer modify the responses or add responses. In some instances, the locking includes locking responses not already locked. Locking the response(s) can include storing the response(s) in a particular memory partition and/or memory type (e.g., ROM).

Query response transmitter 645 securely transmits the stored response data at block 835. The responses can be transmitted to a relay device or central server. In some instances, response data identifying all responses for an executable file is transmitted in a single transmission (e.g., after an end time). In some instances, multiple transmissions are sent, with each including response data identifying various subsets of responses for an exam. For example, a transmission may occur or may be attempted (or a transmission condition may be evaluated) after each response is received, after each response is finalized, after each of a set of responses is received or finalized, etc.

In one instance, the response data is encrypted prior to the transmission. The response data can be encrypted using a key used to decrypt a power file or executable file and/or one generated using a technique disclosed herein. Decrypting response data (e.g., or a file that includes the response data) using a key that is determined using (for example) an identifier of a user, user device, location, time, etc. Use of such a key can allow an evaluation to be performed to ensure, for example, that information accompanying the response data (e.g., in metadata) matches that of the key. For example, a relay device receiving metadata for response data can use a user name or device identifier included in the response data to generate a key. If the key cannot be used to decrypt the response data, it can suggest that a represented user did not provide a response in the response data.

In some instances, whether a transmission is successful or whether it is attempted influences whether and/or how response data is saved. For example, when it is determined that a transmission will occur, will be attempted or was successful, a user device may forego saving the response data or may delete the stored response data.

In some instances, response data can be transmitted to a destination device one or more times before the end time is detected at block 825. The destination device may be different than or the same as a device to which the response data is transmitted at block 835 (e.g., than a relay device). The destination device may include a storage server or device that may be located in a same room or building as the transmitting user device. Such intermediate transmission may serve to build back-up data, which may be used (for example) to reconstruct response data in response to a malfunction of or problem with a user device, relay device or network.

In one instance, a transmission disclosed herein includes an FTP transmission, an SSH transmission and/or a tunneled transmission. In some instances, various types of transmissions may use different transmission techniques. For example, two or more of a transmission of a power file from a relay device to a user device, a transmission of response data to a storage server prior to an end time and a transmission of response data to a relay device at or after an end time may use a different transmission technique.

Figure 9:
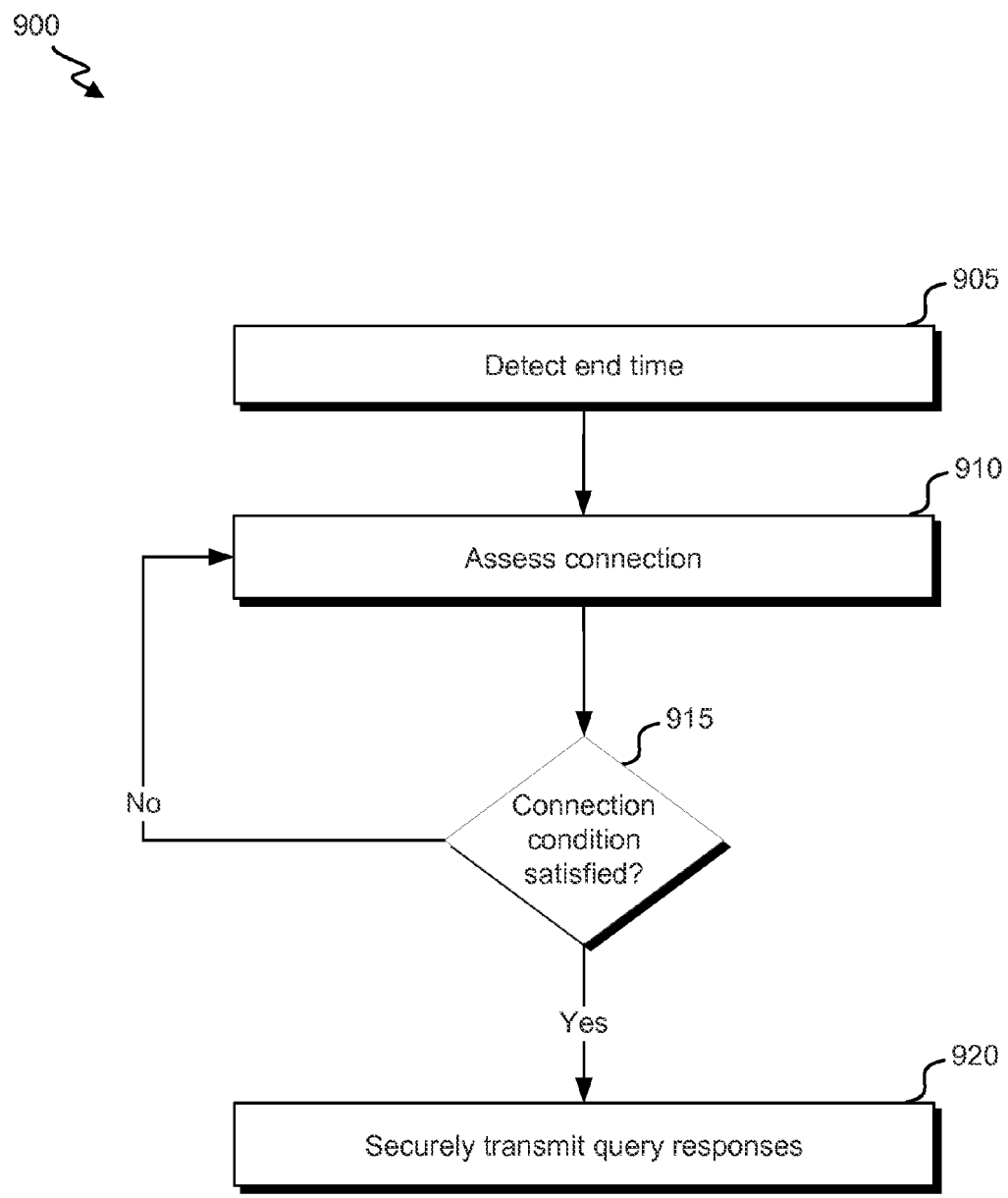
FIG. 9 illustrates a flowchart of an embodiment of a process for conditionally transmitting query responses.

FIG. 9 illustrates a flowchart of an embodiment of a process 900 for conditionally transmitting query responses. Part or all of process 900 can be implemented in a user device. Process 900 begins at block 905 where access engine 630 detects an end time. Block 905 of process 900 can parallel block 825 of process 800.

Connection assessor 650 assesses a connection at block 910. The assessment can include determining whether a connection (e.g., a wireless connection, a wired connection or either) to a network is available, whether a connection to a preferred network or to a network of a preferred type is available, determining a characteristic (e.g., upload or download speed, latency or network strength) of a network, determining whether the user device can communicate with a particular other device (e.g., a relay device or central server), determining how many networks are available, etc.

A connection variable can be determined based on the assessment. For example, a connection variable can reflect a characteristic of a network (or a extremum of a characteristic across all available networks, such as a maximum strength, shortest latency or maximum upload speed), a number of networks available, a number of networks of a particular type or with a particular quality available, whether a preferred network is available, whether a wired connection is available, whether a local area network is available, whether a short-range network is available, and so on.

Connection assessor 650 determines whether a connection condition is satisfied at block 915. The condition can require, for example, that a connection (e.g., a wireless connection, a wired connection or either) to a network be available, that a connection to a preferred network is available, that a connection to a network of a preferred type is available, that the user device can communicate with a particular other device, that a characteristic exceed a zero, non-zero or great-than-one threshold (a strength being above a threshold or a latency being below a threshold), etc. In one instance, the condition requires that a request for the responses be received from another device (e.g., a relay device) within a past particular time period.

When it is determined that the condition is satisfied, process 900 continues to block 920 where query response transmitter 645 securely transmits response data (e.g., to a relay device). Block 920 of process 900 can parallel block 835 of process 800. When it is not determined that the condition is satisfied, process 900 can return to block 910, such that a connection can be repeatedly assessed and a condition repeatedly evaluated until all response data has been transmitted.

In some instances, the return to block 910 is nearly immediate. In other instances, a delay is introduced. The delay may be, at least about, about, or less than about 1 second, 15 seconds, 70 seconds, 1 minute, 10 minutes, 70 minutes, 1 hour, 6 hours, 10 hours, 1 day or 6 days. This delay can serve to reduce repeated evaluations of same network conditions.

In some instances, a quantity of untransmitted responses may build during iterations of the loop in process 900. It will be appreciated that response data may thus be aggregated for storing and/or for transmission. Thus, for example, rather than storing or transmitting multiple units (e.g., files or communications), each including non-response information (e.g., an identifier of a user, a user device, a course and/or an exam), a single unit can include one copy of the non-response information and aggregated response information.

In some instances, process 900 further includes securely storing or caching the response data. The response data can be stored or cached regardless of whether it is determined that the condition is satisfied or not or can be stored only upon determining that the condition is not satisfied. The response data can be stored for a fixed time interval (e.g., one that is at least about 1 minute, 9 minutes, 10 minutes, 70 minutes, 1 hour, or 10 hours), until it is transmitted, until a receipt confirmation is received in response to transmission of the response data, until an available memory space drops below a threshold, until a memory space devoted to the response data and other response data crosses a threshold, and so on.

While process 900 presents an embodiment where a transmission is conditioned based on a connection, it will be appreciated that other types of conditions can additionally or alternatively be used. For example, other conditions may relate to a time since a last transmission (e.g., requiring at least a threshold interval between transmissions), a success of a last transmission (e.g., requiring improved connection assessments following a previous transmission failure), whether an executable file period has ended (e.g., reducing or eliminating transmission conditions upon end of the executable file period), resources available on a user device (e.g., requiring that a resource level be above or below a threshold to attempt transmission), whether a request for responses has been received from a relay device, etc.

In some instances, following a return to block 915, a same type of variable is assessed at block 910 as was previously assessed and/or a same condition is evaluated at block 915 as was previously evaluated. In some instances, a different type of variable is assessed upon a repeat of block 910 and/or a different condition is evaluated at block 915. For example, a threshold for a connection strength in a condition may be reduced following an end time. As another example, a condition may initially require a threshold resource availability on a user device (e.g., so as not to interrupt the exam) while the threshold may be reduced or the resource condition eliminated once the user completes the exam. As another exam, following repeated transmission failures, a condition may require receipt of a request for response data before attempting transmission again.

While transmission of response data can be reserved for instances where an explicit condition is satisfied, it will be appreciated that transmission of response data can also or alternatively be functionally conditioned. For example, if no network is available to a user device or if a network connection is weak, transmission of the response data may not be possible. A functional condition can include instances where transmission attempts fail, where transmissions are not possible, where transmissions performed according to a transmission protocol (e.g., as set forth in an executable file and/or based on data from the user device) are not possible, and so on.

Figure 10:
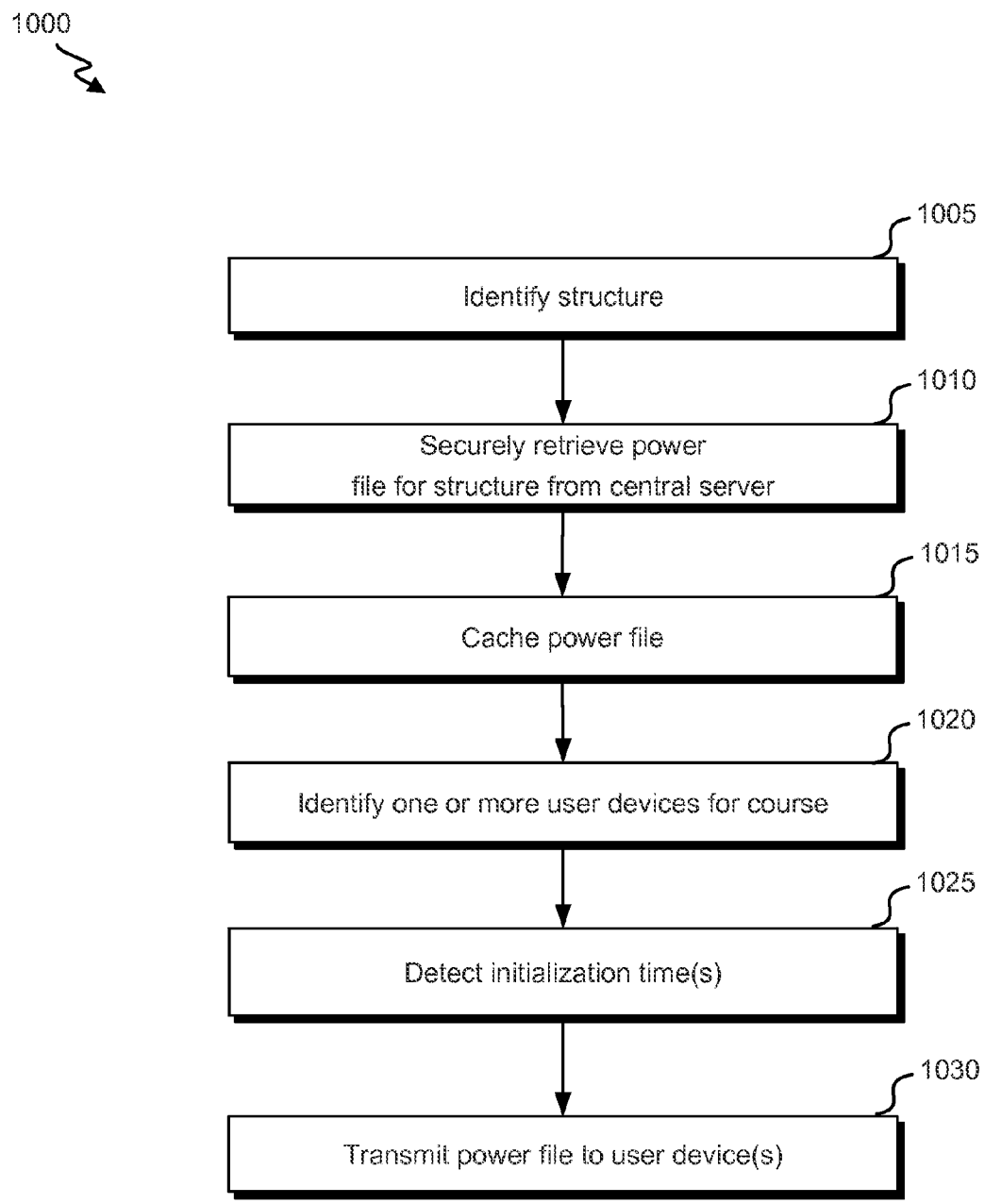
FIG. 10 illustrates a flowchart of an embodiment of a process for caching executable files.

FIG. 10 illustrates a flowchart of an embodiment of a process 1000 for caching executable files. Part or all of process 1000 can be implemented in a relay device. Process 1000 begins at block 1005 where file retriever 620 identifies a structure. For example, a relay device can identify a classroom that the relay device is located in and can identify a structure (e.g., course) associated with that room (e.g., one having an executable file or time associated with that room generally or on a given day). As another example, a relay device may locally store structure information about one or more structures. As yet another example, a relay device may identify a structure based on information in a communication received from another device (e.g., from a central server).

File retriever 620 securely retrieves an power file for the structure from a central server at block 1010. The retrieval can be performed on a day of an exam, a set time before a start time (e.g., a day or week before), at an initialization time, etc. In one instance, retrieving the power file includes sending a request for the power file to the central server. The request can include, for example, an identifier of the relay device, an identifier of a course, an identifier of an executable file and so on. In one instance, the power file is pushed from the central server without requiring a request.

Along with the power file, the central server may provide information indicating when (e.g., an absolute or relative time or an absolute or relative time period) the power file is to be provided to user devices and/or which user devices are to allowed to retrieve the power file.

File retriever 620 caches the power file in an executable-file data store resident on the relay device at block 1015. In some instances, file retriever 620 processes the power file to, e.g., decrypt, encrypt, secure or at least partly de-secure the power file.

Access engine 630 identifies one or more user devices for the structure (e.g., course) at block 1020. This identification can be performed using information provided (along with the power file or separately) by the central server, by a device detection technique (e.g., detecting devices on a particular network, detecting devices in a room or detecting nearby devices), or by analyzing information received from other devices (e.g., determining whether an executable file code matches one for the power file, determining whether a user or device identifier matches one associated with the power file, etc.).

Access engine 630 detects one or more initialization times at block 1025. Block 1025 can parallel block 715 of process 700. In some instances, receiving a request for a power file or receiving the power file from the central server can indicate that a current time qualifies as being an initialization time.

A relay-device transmitter causes the power file to be transmitted to one or more user devices at block 1030. In some instances, the power file is pushed to one, some or all of the identified one or more user devices. In some instances, the power file is not transmitted to a user device in the identified one or more user devices until a request for the power file is first received. In instances where the power file is sent to multiple user devices, the power file may be sent to the devices simultaneously or at different times.

A period between receipt of the power file and transmission of the power file (or processed version thereof), a period between receipt of the power file and a start time, a period between request for the power file and transmission of the power file (or processed version thereof), a period between request for the power file and a start time, and/or a period of caching of the power file may be at least about 1 minute, 9 minutes, 70 minutes, 1 hour, 10 hours, 12 hours, 1 day, 6 days or 1 week. By caching the power file in advance, a system load at a common executable file time can be reduced. In some instances, a schedule is developed across relay devices or exams such that a one of the above-listed time periods is varied across exams, relay devices, etc. Additionally or alternatively, the time period may depend at least in part on when a proctor input was received. In either case, a coordinated pre-executable file load may also be reduced.

Figure 11:
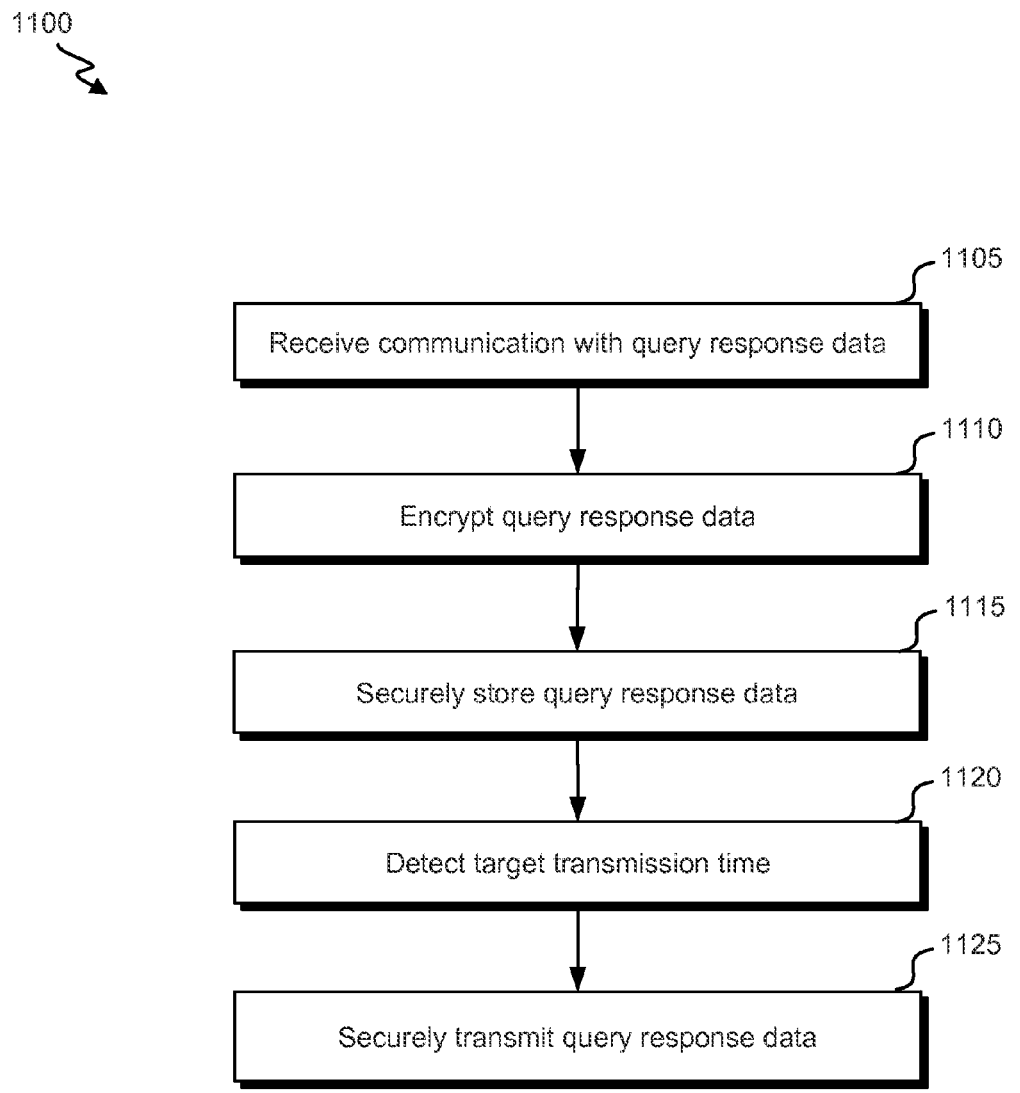
FIG. 11 illustrates a flowchart of an embodiment of a process for caching query responses.

FIG. 11 illustrates a flowchart of an embodiment of a process 1100 for caching query responses. Part or all of process 1100 can be implemented in a relay device. Process 1100 begins at block 1105 where a response receiver on a relay device receives a communication from a user device. The communication can include query response data, which can include a response and, in some instances, an identifier of one or more of: a user device, a user, a course, an executable file, a power file, an exam, a question, a response time and so on.

Query response engine 635 encrypts or otherwise secures the response data at block 1110. In some instances, the received response data is already secure and/or encrypted, and no additional securing or encryption is performed. The response data can be encrypted using a key identified using a technique disclosed herein. For example, a key can include or can be generated using an identifier or a user or device. Query response engine 635 securely stores the response data at block 1115.

Access engine 630 detects an executable file target transmission time at block 1120. The target transmission time can be identified based on data in an exam-related file, based on a communication received from a central server, based on input from a proctor (e.g., indicating that responses are to be submitted to the central server), based on a rule, etc. In one instance, a central server sends a request for responses to the relay device, and a time of receipt of the request can serve as the target transmission time. In some instances, the target transmission time is functionally determined (e.g., determined as being a time when responses are received from all user devices in a room, all user devices that received an executable file, etc.).

Query response transmitter 645 securely transmits response data to a central server at block 1125. In some instances, all response data associated with an executable file is transmitted in a single transmission or communication and/or substantially concurrently. In some instances, multiple transmissions with response data are sent. For example, response data for one user device or a set of user devices can be transmitted as soon as it is received.

The transmission at block 1125 can be conditioned. The condition may depend on, e.g., a load on a central server, whether a response-data request has been received from a central server, a quantity of response data received, an end time, a network strength, a network availability, a resource load or availability on a relay device, etc.

Figure 12:
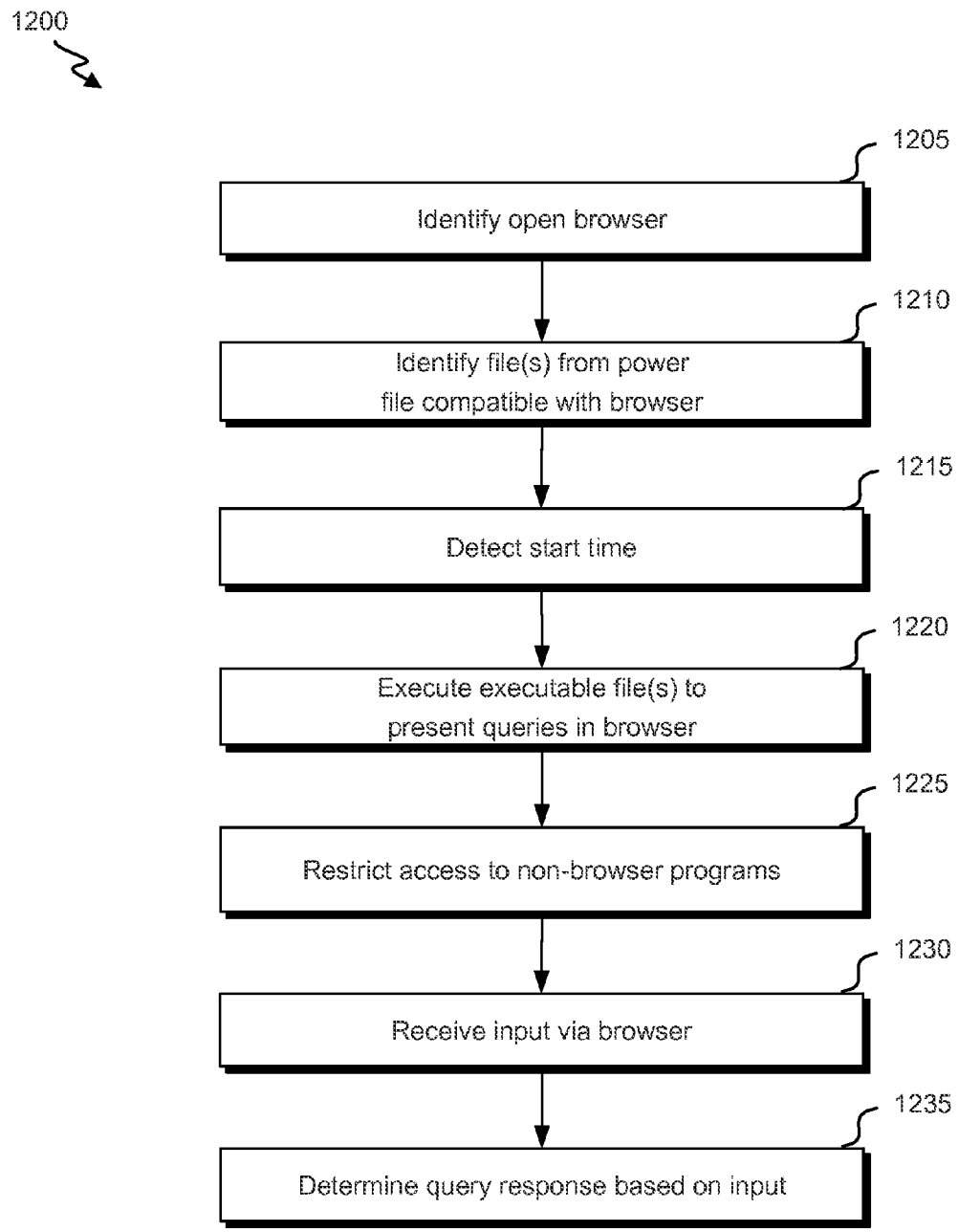
FIG. 12 illustrates a flowchart of an embodiment of a process for electronically executing an executable file.

FIG. 12 illustrates a flowchart of an embodiment of a process 1200 for executing an executable file. Part or all of process 1200 can be implemented in a user device. Process 1200 begins at block 1205 where file retriever 620 identifies an open browser (e.g., as being Explorer®, Chrome®, Firefox® or Safari®). In instances where multiple browsers are open, file retriever 620 can identify a browser most recently opened, a browser which most recently was interacted with, a browser front-most on a screen, and so on.

File retriever 620 identifies one or more executable files from an power file that are compatible with the open browser at block 1210. The identification can be compared by detecting metadata indicating compatibilities of files, by analyzing content of files, by evaluating a rule, by analyzing a function or file name, by analyzing an if function, and so on. In some instances, block 1210 includes identifying one or more parts of executable files that are compatible with the open browser.

Access engine 630 detects a start time at block 1215. Block 1215 of process 1200 can correspond to block 805 of process 800.

At block 1220, access engine 630 executes at least one of the one or more executable files (or parts of the file) such that one or more queries are presented in the open browser. Thus, for example, if a user opens an Explorer® browser, executable file queries or questions can be presented in the Explorer® browser, and executable file responses can be received via the Explorer® browser. It will be appreciated that one or more other executable files (or parts of executable files) may not have browser compatibility restrictions and can be executed at block 1220 regardless of the browser identified at block 1205.

Via execution of the at least one executable files or of other files, access engine 630 restricts access to non-browser programs at block 1225. The extent of the restriction can be determined based on an exam, a course, a user device, and so on. For example, an instructor may indicate that users are allowed to access the Internet and Microsoft Word® during a test but no other applications. The central server can then generate or modify one or more executable files to enforce this restriction. An attempt to access a restricted application may result in a lack of traditional response, an error, or a negative executable file occurrence (e.g., ending a file execution).

Interface engine 615 receives user input via the browser at block 1230. For example, a user may enter text, select a button option or other input option (e.g., an option on a drop-down menu, a slider value, a list option, etc.), click on a location on a screen (e.g., corresponding to a location in a graphic), etc. In some instances, the user response also includes input indicating that a response is complete, input indicating that a response is finalized, a request to progress to a next query, etc.

Query response engine 635 determines a query response based on the input at block 1235. The determination may include mapping the input to response data. For example, a selection of an option can be mapped to a selection of a particular response. As another example, clicking on a screen location can be mapped to identifying a particular location within an image. As another example, entered text can be identified as a response. The response data can further associate the response with an identifier of one or more of: a question, a user, a user device, a response time, a course, an exam, and so on.

Figure 13:
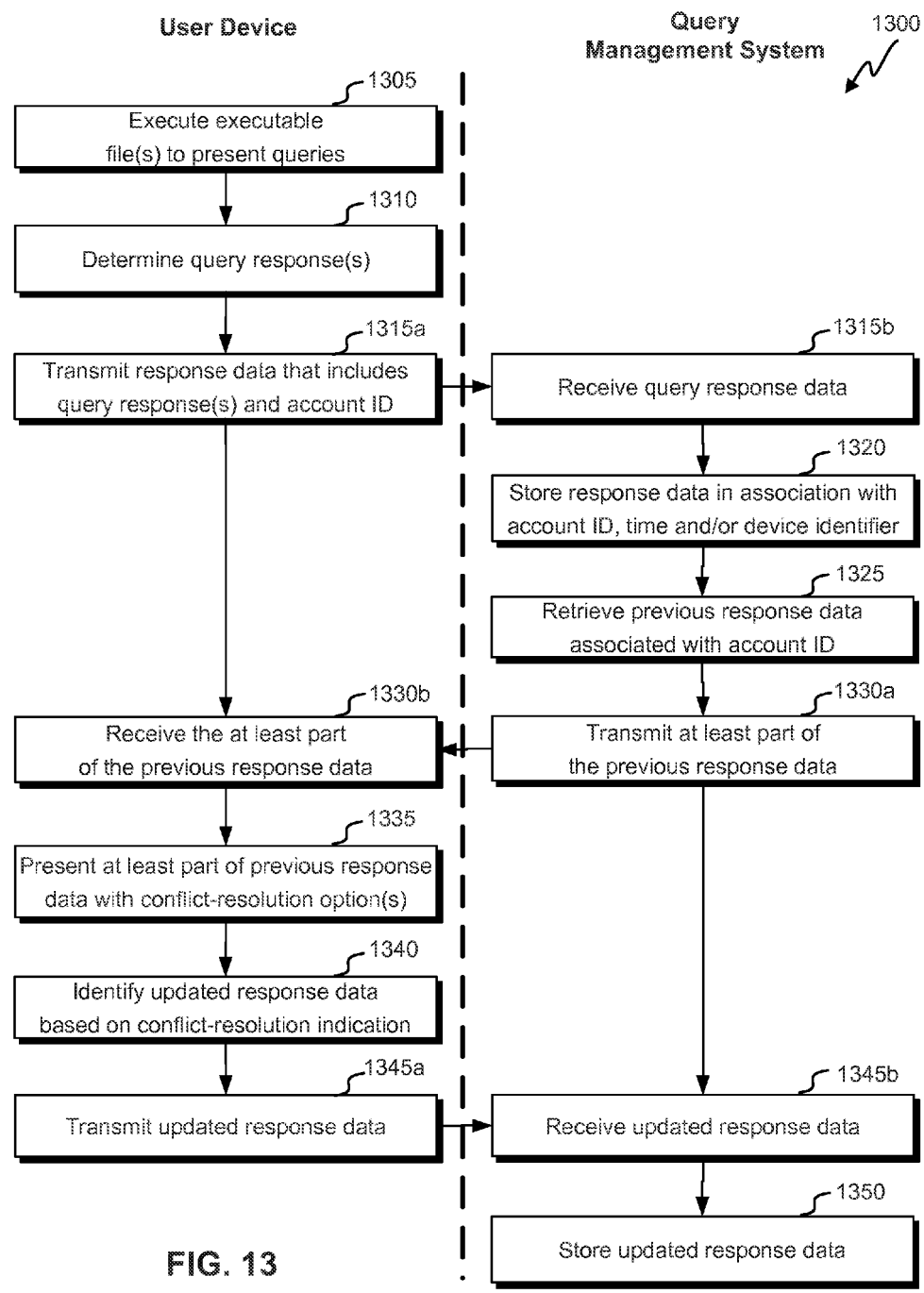
FIG. 13 illustrates a flow diagram of an embodiment of a process for updating query response data based on conflict-resolution indications.

FIG. 13 illustrates a flowchart of an embodiment of a process 1300 for updating query response data based on conflict-resolution indications. Part of process 1200 can be implemented in a user device, such as user device 106. Part of process 1200 can be performed in a query management system, which can include (for example) a content management server 102, relay device, or other server or system (e.g., located remotely or in a same building or room as the user device).

Process 1300 begins at block 1305 where the user device executes one or more executable files, which can facilitate a local presentation of each of one or more questions or queries. At block 1310, a query response for each of the one or more queries is determined (e.g., based on provided input). At block 1315*a*, response data that includes the query response(s) and potentially additional information (e.g., an identifier of an account, user, user device, and/or corresponding queries) is transmitted to the query management system. The response data is received at the query management system at block 1315*b* and stored in association with an identifier of an account, user, user device and/or time (e.g., of receipt of the response data or a time identified in the response data). Each of one or more of blocks 1305-1320 can correspond to similar actions disclosed herein.

At block 1325, previous response data associated with a same user identifier or account identifier is retrieved (e.g., from a local storage or by sending a data request to a remote storage server). The previous response data can include identifiers of responses provided for a same executable file, exam, power file and/or date as that associated with the response data. In some instances, the previous response data and the response data were transmitted from different user devices. Depending on the embodiment, block 1325 is conditionally performed. For example, block 1325 may be performed when the response data or a corresponding communication includes a request for the previous response data.

In some instances, each of the response data and the previous response data include a (same or different) response to a same query. In some alternative or same instances, each of the response data and the previous response data include a response to a different query.

At block 1330*a*, at least part of the previous response data is transmitted to the user device, which is received at the user device at block 1330*b*. In one instance, each response in the previous response data is transmitted. In one instance, each query for which a response is included in each of the response data and the previous response data are identified, and the previous-response-data responses for each of those queries are included in the transmission. In one instance, each query for which different responses included in each of the response data and the previous response data are identified, and the previous-response-data responses for each of those queries are included in the transmission.

In some instances, transmission of the at least part of the previous response data is conditioned. For example, block 1330*a* may be performed only when the previous response data and the response data include at least one conflicting response and/or if the previous response data includes a response not provided in the response data. The transmission may also include other information, such as identifiers of queries for which no response conflict was detected.

At block 1335, the at least part of the previous response data is presented (e.g., at a single time or at multiple times). The presentation can include, for example, presenting an identifier of a query or a query itself along with a response as identified in the previous response data. The presentation may further include an identifier of a response as identified in the response data. When the responses from the previous response data and the response data conflict, the presentation can include a conflict-resolution option. For example, the conflict-resolution option can allow a user to select one of the two options.

At block 1340, updated response data is identified based on a conflict-resolution indication. The conflict-resolution indication can be provided via interaction with the conflict-resolution option. For example, the conflict-resolution indication can identify a selected response for a particular query. The updated response data can include a selection between conflicting responses (or a response selection in general) for each of one or more queries, an identification of each of the one or more queries and/or an identifier of a user, user device, account and/or time.

At block 1345*a*, the update response data is transmitted from the user device to the query management system, and the query management system receives the updated response data at block 1345*b*. The updated response data is stored at block 1350. Storing the updated response data can include, for example, deleting an unselected response, changing a status (e.g., to final or selected) of a response, committing a response to a particular memory or memory partition or storing a new data segment.

Process 1300 thus provides a technique for detecting and to responding to conflicting data. Such data may be provided from different devices and may be a result of experience of a device or network problem during initial execution of a file. Process 1300 allows an executable file to initiate and run without needing to first retrieve response data, and yet normal response transmission can trigger a technique for detecting and responding to data conflicts.

Embodiments herein provide a variety of technical advantages. For example, the inclusion of relay devices in networks can allow traffic involving a central server to be distributed in time so as to reduce peak loads. Proximity between relay devices and user devices enable the devices to communicate over short-range or wired connections to further reduce network demands during high-use time periods. Encryption techniques using device-specific keys can serve to verify that a source of a response is as is identified in metadata or input. Use of power files and browser-detection techniques can allow consistent content to be provided across browser types and to allow users to use familiar controls. Conditioned transmission of response data can reduce network demand to avoid repeated network use in ineffective connection attempts. Use of differential locking and unlocking configurations when storing responses can allow for adaptation in content and queries while still permitting acceptable levels of modification that would not disrupt the adaptation processes.

A number of variations and modifications of the disclosed embodiments can also be used. Specific details are given in the above description to provide a thorough understanding of the embodiments. However, it is understood that the embodiments may be practiced without these specific details. For example, well-known circuits, processes, algorithms, structures, and techniques may be shown without unnecessary detail in order to avoid obscuring the embodiments.

Implementation of the techniques, blocks, steps and means described above may be done in various ways. For example, these techniques, blocks, steps and means may be implemented in hardware, software, or a combination thereof. For a hardware implementation, the processing units may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described above, and/or a combination thereof.

Also, it is noted that the embodiments may be described as a process which is depicted as a flowchart, a flow diagram, a swim diagram, a data flow diagram, a structure diagram, or a block diagram. Although a depiction may describe the operations as a sequential process, many of the operations can be performed in parallel or concurrently. In addition, the order of the operations may be re-arranged. A process is terminated when its operations are completed, but could have additional steps not included in the figure. A process may correspond to a method, a function, a procedure, a subroutine, a subprogram, etc. When a process corresponds to a function, its termination corresponds to a return of the function to the calling function or the main function.

Furthermore, embodiments may be implemented by hardware, software, scripting languages, firmware, middleware, microcode, hardware description languages, and/or any combination thereof. When implemented in software, firmware, middleware, scripting language, and/or microcode, the program code or code segments to perform the necessary tasks may be stored in a machine readable medium such as a storage medium. A code segment or machine-executable instruction may represent a procedure, a function, a subprogram, a program, a routine, a subroutine, a module, a software package, a script, a class, or any combination of instructions, data structures, and/or program statements. A code segment may be coupled to another code segment or a hardware circuit by passing and/or receiving information, data, arguments, parameters, and/or memory contents. Information, arguments, parameters, data, etc. may be passed, forwarded, or transmitted via any suitable means including memory sharing, message passing, token passing, network transmission, etc.

For a firmware and/or software implementation, the methodologies may be implemented with modules (e.g., procedures, functions, and so on) that perform the functions described herein. Any machine-readable medium tangibly embodying instructions may be used in implementing the methodologies described herein. For example, software codes may be stored in a memory. Memory may be implemented within the processor or external to the processor. As used herein the term "memory" refers to any type of long term, short term, volatile, nonvolatile, or other storage medium and is not to be limited to any particular type of memory or number of memories, or type of media upon which memory is stored.

Moreover, as disclosed herein, the term "storage medium" may represent one or more memories for storing data, including read only memory (ROM), random access memory (RAM), magnetic RAM, core memory, magnetic disk storage mediums, optical storage mediums, flash memory devices and/or other machine readable mediums for storing information. The term "machine-readable medium" includes, but is not limited to portable or fixed storage devices, optical storage devices, and/or various other storage mediums capable of storing that contain or carry instruction(s) and/or data.

While the principles of the disclosure have been described above in connection with specific apparatuses and methods, it is to be clearly understood that this description is made only by way of example and not as limitation on the scope of the disclosure.

What is claimed is:

1. A system for electronically conditioning transmission of communications based on results of a connection assessment, the system comprising:
   a file retriever that receives, at an electronic device, one or more electronic files;
   an access engine that executes at least one of the one or more electronic files, wherein the execution causes each of a first query and a second query to be presented at the electronic device;
   a query response engine that:
      identifies a first query response corresponding to the first query;
      stores the first query response in a locked configuration, the locked configuration inhibiting the ability to modify the first query response to the first query;
      identifies a second query response corresponding to the second query;
      stores the second query response, the second query response not being stored in a locked configuration and being stored in a configuration that enables the stored second query response to be modified;
      generates query response data that includes an identifier of each of one or more queries, an identifier of each of one or more query responses, and an identifier of the electronic device, the one or more queries including the second query, and the one or more query responses includes the second query response;
   a connection assessor that:
      determines a connection variable by assessing one or more network connections available to the electronic device; and
      determines whether a transmission condition is satisfied based on the connection variable, the determination including comparing the connection variable to a threshold, a result of the determination indicating that the transmission condition is satisfied when the connection variable exceeds the threshold; and
   a query response transmitter that, when it is determined that the transmission condition is satisfied, transmits the query response data from the electronic device to another device.

2. The system for electronically conditioning transmission of communications based on results of a connection assessment as recited in claim 1, wherein the query response engine further retrieves, for each of the first query and the second query, configuration data that indicates whether a corresponding query response is to be stored in the locked configuration.

3. The system for electronically conditioning transmission of communications based on results of a connection assessment as recited in claim 1, wherein:
the query response engine further:
determines, subsequent to the generating the query response data, that the second query response is to be changed to a different second query response;
modifies the stored second query response to be the different second query response; and
generates new query response data that includes an identifier of the second query, an identifier of the different second query response and an identifier of the electronic device;
the connection assessor that:
determines an updated connection variable by assessing one or more network connections available to the electronic device; and
determines whether the transmission condition is satisfied based on the updated connection variable; and
the query response transmitter further transmits the new query response data when it is determined that the transmission condition is satisfied based on the updated connection variable.

4. The system for electronically conditioning transmission of communications based on results of a connection assessment as recited in claim 1, wherein the query response engine further: determines, subsequent to the generating the query response data and based on a time, that a configuration of the second query response is to be changed to the locked configuration; and updates the configuration of the second query response to the locked configuration.

5. The system for electronically conditioning transmission of communications based on results of a connection assessment as recited in claim 1, wherein the one or more query responses further includes the first query response.

6. The system for electronically conditioning transmission of communications based on results of a connection assessment as recited in claim 1, wherein determining that the transmission condition is not satisfied further causes the query response data to be aggregated with other query response data, and wherein the query response transmitter transmits the aggregated query response data and other query response data upon a subsequent determination that the transmission condition is satisfied.

7. The system for electronically conditioning transmission of communications based on results of a connection assessment as recited in claim 1, wherein the connection variable is indicative of a strength of a connection.

8. The system for electronically conditioning transmission of communications based on results of a connection assessment as recited in claim 1, wherein:
the file retriever further receives, at the electronic device, a set of electronic files, the set of electronic files including the one or more electronic files, the one or more electronic files including a first executable file compatible with a first browser, the set of electronic files including a second executable file compatible with a second browser; and
the access engine further:
identifies that code for the first browser is being executed on the electronic device; and
selects the first executable file for execution based on the identification that code for the first browser is being executed,
wherein the second executable file is not executed at the electronic device.

9. A computer-implemented method for electronically conditioning transmission of communications based on results of a connection assessment, the method comprising:
executing, at an electronic device, one or more electronic files, wherein the execution causes each of a first query and a second query to be presented at the electronic device;
identifying, at the electronic device, a first query response corresponding to the first query;
storing, at the electronic device, the first query response in a locked configuration, the locked configuration inhibiting the ability to modify the first query response to the first query;
identifying, at the electronic device, a second query response corresponding to the second query;
storing, at the electronic device, the second query response, the second query response not being stored in a locked configuration and being stored in a configuration that enables the stored second query response to be modified;
generating, at the electronic device, query response data that includes an identifier of each of one or more queries, an identifier of each of one or more query responses, and an identifier of the electronic device, the one or more queries including the second query, and the one or more query responses includes the second query response;
determining, at the electronic device, a connection variable by assessing one or more network connections available to the electronic device;
determining, at the electronic device, whether a transmission condition is satisfied based on the connection variable, the determination including comparing the connection variable to a threshold, a result of the determination indicating that the transmission condition is satisfied when the connection variable exceeds the threshold; and
when it is determined that the transmission condition is satisfied, transmitting the query response data from the electronic device to another device.

10. The method for electronically conditioning transmission of communications based on results of a connection assessment as recited in claim 9, further comprising:
retrieving, for each of the first query and the second query, configuration data that indicates whether a corresponding query response is to be stored in the locked configuration.

11. The method for electronically conditioning transmission of communications based on results of a connection assessment as recited in claim 9, further comprising:
determining, subsequent to the generating the query response data, that the second query response is to be changed to a different second query response;
modifying the stored second query response to be the different second query response;
generating new query response data that includes an identifier of the second query, an identifier of the different second query response and an identifier of the electronic device;
determining an updated connection variable by assessing one or more network connections available to the electronic device;
determining whether the transmission condition is satisfied based on the updated connection variable; and transmitting the new query response data when it is determined that the transmission condition is satisfied based on the updated connection variable.

12. The method for electronically conditioning transmission of communications based on results of a connection assessment as recited in claim 9, further comprising: determining, subsequent to the generating the query response data and based on a time, that a configuration of the second query response is to be changed to the locked configuration; and updating the configuration of the second query response to the locked configuration.

13. The method for electronically conditioning transmission of communications based on results of a connection assessment as recited in claim 9, wherein the one or more query responses further includes the first query response.

14. The method for electronically conditioning transmission of communications based on results of a connection assessment as recited in claim 9, wherein determining that the transmission condition is not satisfied further causes the query response data to be aggregated with other query response data, and wherein the method further comprises: transmitting the aggregated query response data and other query response data upon a subsequent determination that the transmission condition is satisfied.

15. The method for electronically conditioning transmission of communications based on results of a connection assessment as recited in claim 9, wherein the connection variable is indicative of a strength of a connection.

16. The method for electronically conditioning transmission of communications based on results of a connection assessment as recited in claim 9, further comprising:
receiving, at the electronic device, a set of electronic files, the set of electronic files including the one or more electronic files, the one or more electronic files including a first executable file compatible with a first browser, the set of electronic files including a second executable file compatible with a second browser;
identifying that code for the first browser is being executed on the electronic device; and
selecting the first executable file for execution based on the identification that code for the first browser is being executed,
wherein the second executable file is not executed at the electronic device.

17. A computer-program product tangibly embodied in a non-transitory machine-readable storage medium, including instructions configured to cause one or more data processors to perform actions including:
executing one or more electronic files, wherein the execution causes each of a first query and a second query to be presented at an electronic device;
identifying a first query response corresponding to the first query;
storing the first query response in a locked configuration, the locked configuration inhibiting the ability to modify the first query response to the first query;
identifying a second query response corresponding to the second query;
storing the second query response, the second query response not being stored in a locked configuration and being stored in a configuration that enables the stored second query response to be modified;
generating query response data that includes an identifier of each of one or more queries, an identifier of each of one or more query responses, and an identifier of the electronic device, the one or more queries including the second query, and the one or more query responses includes the second query response;
determining a connection variable by assessing one or more network connections available to the electronic device;
determining whether a transmission condition is satisfied based on the connection variable, the determination including comparing the connection variable to a threshold, a result of the determination indicating that the transmission condition is satisfied when the connection variable exceeds the threshold; and
when it is determined that the transmission condition is satisfied, facilitating a transmission of the query response data from the electronic device to another device.

18. The computer-program product as recited in claim 17, wherein the actions further include:
retrieving, for each of the first query and the second query, configuration data that indicates whether a corresponding query response is to be stored in the locked configuration.

19. The computer-program product as recited in claim 17, wherein the actions further include:
determining, subsequent to the generating the query response data, that the second query response is to be changed to a different second query response;
modifying the stored second query response to be the different second query response;
generating new query response data that includes an identifier of the second query, an identifier of the different second query response and an identifier of the electronic device;
determining an updated connection variable by assessing one or more network connections available to the electronic device;
determining whether the transmission condition is satisfied based on the updated connection variable; and
facilitating a transmission of the new query response data when it is determined that the transmission condition is satisfied based on the updated connection variable.

20. The computer-program product as recited in claim 17, wherein the actions further include: determining, subsequent to the generating the query response data and based on a time, that a configuration of the second query response is to be changed to the locked configuration; and updating the configuration of the second query response to the locked configuration.

* * * * *

UNITED STATES PATENT AND TRADEMARK OFFICE
CERTIFICATE OF CORRECTION

Page 1 of 1

PATENT NO. : 9,870,395 B2
APPLICATION NO. : 14/753858
DATED : January 16, 2018
INVENTOR(S) : Brendan Kealey et al.

It is certified that error appears in the above-identified patent and that said Letters Patent is hereby corrected as shown below:

On the Title Page

Item (72) Inventors: Delete "Rob Nielsen, Prior Lake, MN (US)" and insert -- Robbie Allen Nielsen, Prior Lake, MN (US) --

Signed and Sealed this
Seventeenth Day of July, 2018

Andrei Iancu
*Director of the United States Patent and Trademark Office*